United States Patent
Yu et al.

(10) Patent No.: US 10,194,441 B2
(45) Date of Patent: Jan. 29, 2019

(54) BANDWIDTH REDUCTION WITH BEAMFORMING AND DATA COMPRESSION

(71) Applicant: Nokia Solutions and Networks Oy, Espoo (FI)

(72) Inventors: Xiaoyong Yu, Grayslake, IL (US); Ke-Kang Chin, Bartlett, IL (US); Alan Rottinghaus, Barrington, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/384,877

(22) Filed: Dec. 20, 2016

(65) Prior Publication Data

US 2018/0176898 A1 Jun. 21, 2018

(51) Int. Cl.
*H04W 72/04* (2009.01)
*H04W 16/28* (2009.01)
(Continued)

(52) U.S. Cl.
CPC ........ *H04W 72/046* (2013.01); *H04B 7/0695* (2013.01); *H04W 16/28* (2013.01);
(Continued)

(58) Field of Classification Search
CPC ............. H04W 72/04; H04W 72/0413; H04W 72/046; H04W 72/0446; H04W 88/08;
(Continued)

(56) References Cited

U.S. PATENT DOCUMENTS

| 2005/0136963 A1* | 6/2005 | Frank | H04B 7/0634 455/522 |
| 2006/0030365 A1* | 2/2006 | Hovers | H04B 7/04 455/562.1 |

(Continued)

FOREIGN PATENT DOCUMENTS

WO WO-2010/043752 A1 4/2010

OTHER PUBLICATIONS

"Common Public Radio Interface (CPRI); Interface Specification", CPRI Specification V6.0, Aug. 30, 2013, 128 pgs.
(Continued)

*Primary Examiner* — Candal Elpenord
*Assistant Examiner* — Ricardo H Castaneyra
(74) *Attorney, Agent, or Firm* — Harrington & Smith

(57) ABSTRACT

Described are techniques for limiting bandwidth requirements for user equipment UE data sent on a front haul link between a remote radio head RRH and a baseband unit BBU. For a given UE a subset of a plurality of beams is selected based on received energies of the plurality of beams, and for the given UE only data from the selected subset of beams transmitting on a front haul link. Multiple techniques are detailed for how the subset is selected, including (when UE allocation information is available) averaged received beam energy, total received beam energy, maximum received beam energy and also (when UE allocation information is not available). For further bandwidth reduction a special data compression technique uses the
(Continued)

received energies of each beam to select a minimum gain offset value after dividing the data into I and Q components.

17 Claims, 20 Drawing Sheets

(51) Int. Cl.
*H04W 28/06* (2009.01)
*H04B 7/06* (2006.01)
*H04W 88/08* (2009.01)

(52) U.S. Cl.
CPC ....... *H04W 28/06* (2013.01); *H04W 72/0446* (2013.01); *H04W 88/085* (2013.01); *H04B 7/0617* (2013.01)

(58) Field of Classification Search
CPC ... H04W 88/085; H04W 16/28; H04W 24/02; H04W 28/10; H04W 28/06; H04B 7/0452; H04B 7/0617; H04B 7/0417; H04B 7/0413; H04B 7/0695; H04B 7/088; H04B 7/0408; H04B 7/0619; H04B 7/0658; H04B 7/04
See application file for complete search history.

(56) References Cited

U.S. PATENT DOCUMENTS

| | | | |
|---|---|---|---|
| 2008/0219194 A1* | 9/2008 | Kim | H04B 7/0452 370/310 |
| 2009/0290632 A1* | 11/2009 | Wegener | H03M 7/30 375/240 |
| 2011/0255434 A1* | 10/2011 | Ylitalo | H01Q 1/246 370/252 |

OTHER PUBLICATIONS

Vu Thang X et al Adaptive Compression and Joint Detection for Fronthaul Uplinks in Cloud Radio Access Networks; 2015.
Bin Guo et al CPRI compression transport for LTE and LTE-A signal in C-RAN; 2012.

* cited by examiner

RAN PROCESSING U-PLANE CHAIN SPLITS AND ASSOCIATED RATES OVERVIEW

GENERIC VIEW OF mMIMO ARCHITECTURE: ADAPTIVE BEAMS SELECTION

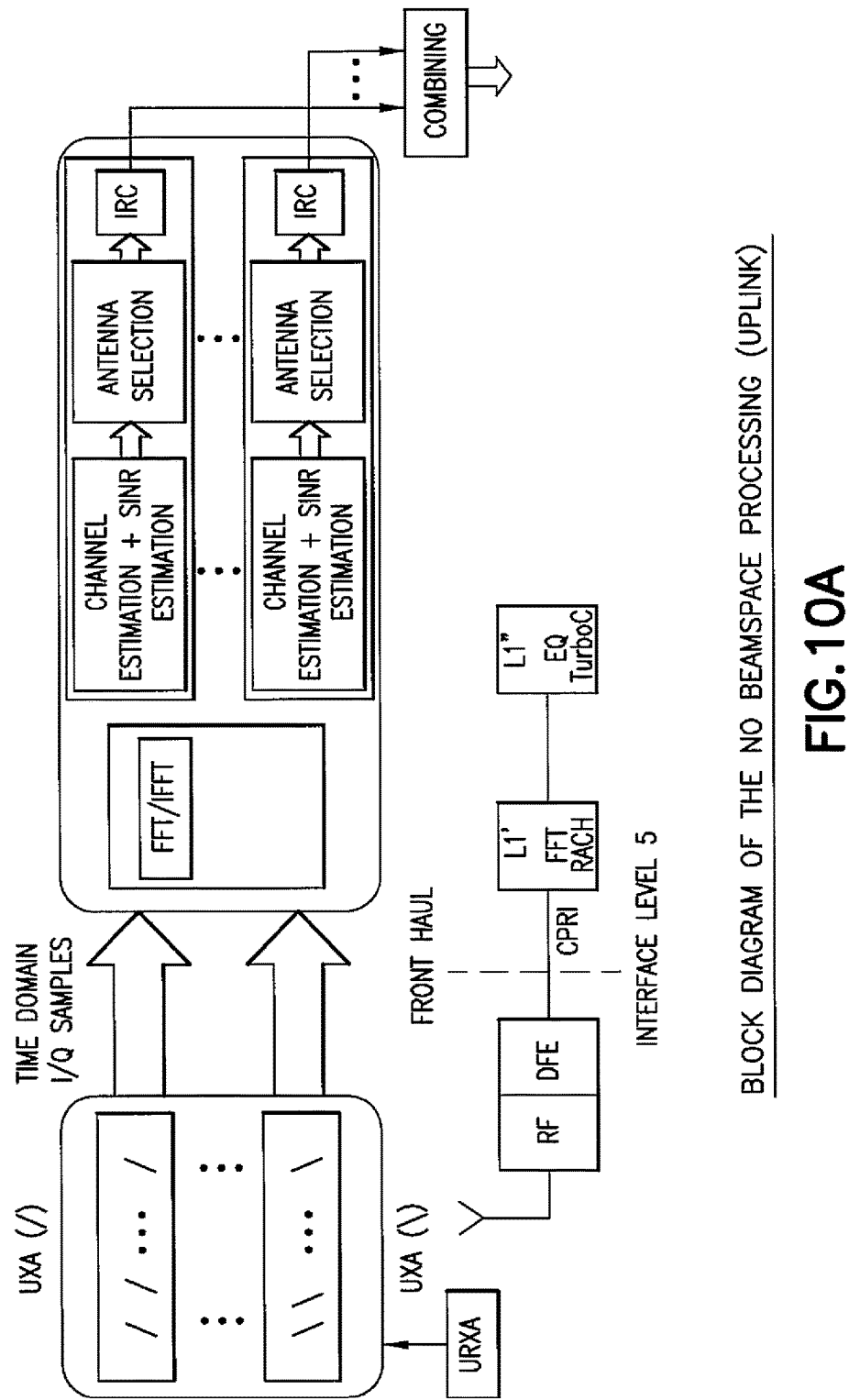

BLOCK DIAGRAM OF THE NO BEAMSPACE PROCESSING (UPLINK)

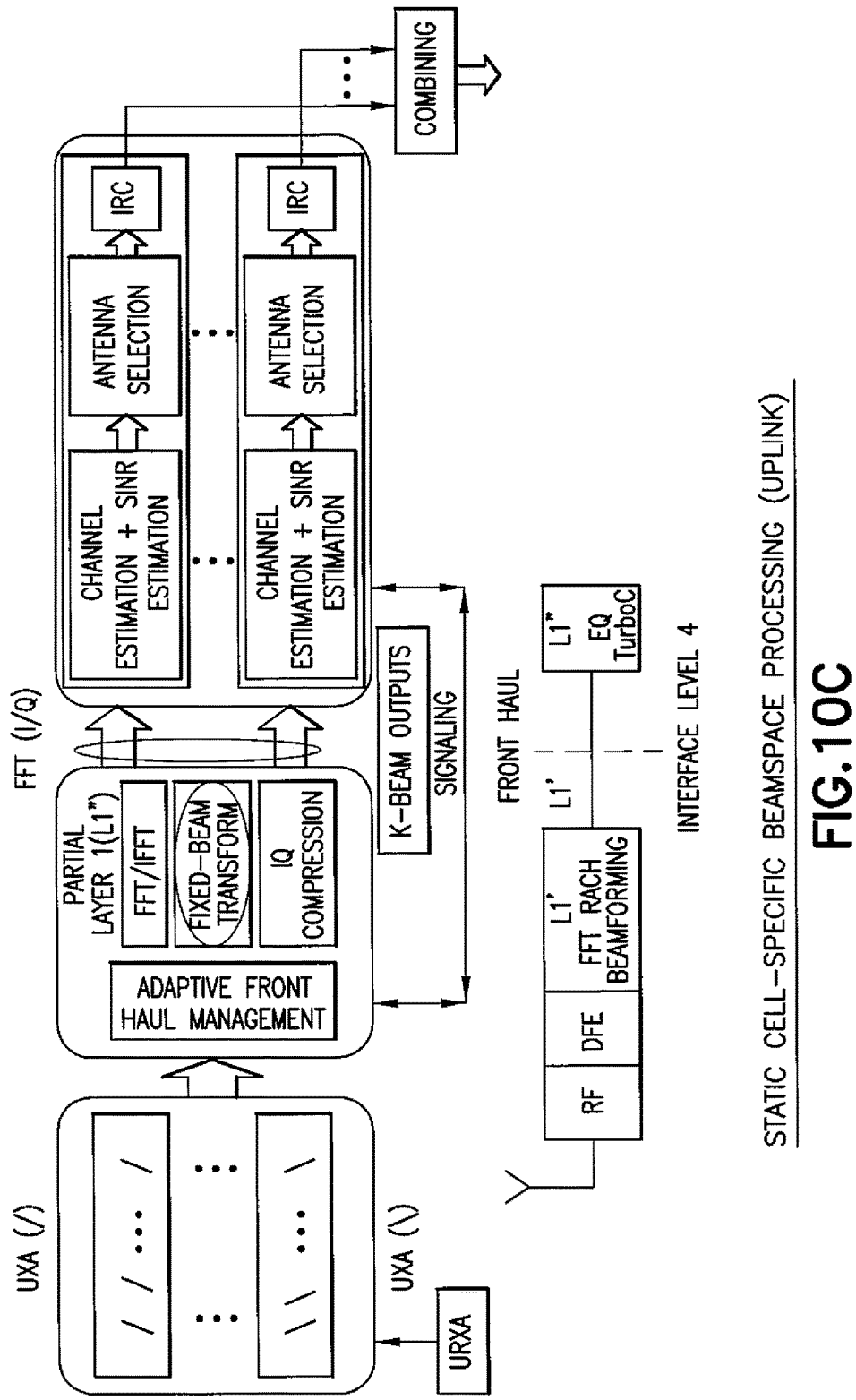

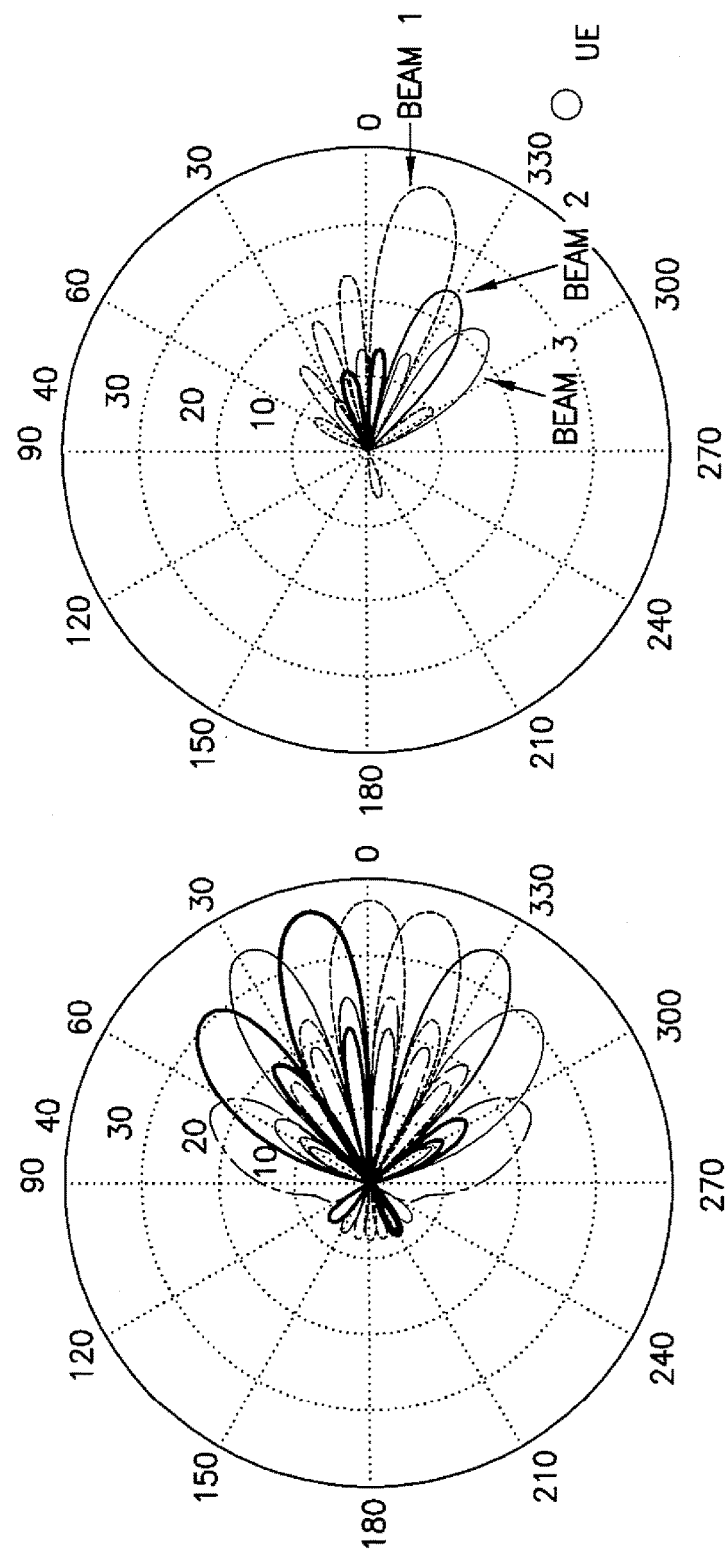

FRONT HAUL BANDWIDTH SAVINGS WITH L1' CELL-SPECIFIC BEAMFORMING

BASELINE:
- RF BEAMFORMING IN THE VERTICAL DOMAIN: AS IN CASE 1 AND CASE 2 FOR COMPARISON
- NO HORIZONTAL BEAMFORMING

| BASELINE: | FFT (IQ COMPRESSED) (Mbps) |
|---|---|
| 2Rx | 470 |
| 8Rx (CASE 1) | 1880 |
| 32Rx (CASE 2) | 7520 |

CASE 1: (TOTAL 8 BEAMS)
- RF BEAMFORMING IN THE VERTICAL DOMAIN:
- DOWN TILT ANGLE: 15 DEGREE
- 8 ANTENNA PORTS
- CELL-SPECIFIC BEAMFORMING IN THE HORIZONTAL DOMAIN: 8 BEAMS

| BEAM SELECTION | BANDWIDTH REQUIREMENTS (Mbps) | BANDWIDTH SAVINGS |
|---|---|---|
| 8 BEAMS | 1880 | 00.0% |
| 7 BEAMS | 1645 | 12.5% |
| 6 BEAMS | 1410 | 25.0% |
| 5 BEAMS | 1175 | 37.5% |
| 4 BEAMS | 940 | 50.0% |
| 3 BEAMS | 705 | 62.5% |
| 2 BEAMS | 470 | 75.0% |
| 1 BEAMS | 235 | 87.5% |

CASE 2: (TOTAL 32 BEAMS)
- RF BEAMFORMING IN THE VERTICAL DOMAIN:
- DOWN TILT ANGLE: 15 DEGREE
- 32 ANTENNA PORTS PER DOWN TILT ANGLE
- CELL-SPECIFIC BEAMFORMING IN THE HORIZONTAL DOMAIN: 32 BEAMS

| BEAM SELECTION | BANDWIDTH REQUIREMENTS (Mbps) | BANDWIDTH SAVINGS |
|---|---|---|
| 32 BEAMS | 7520 | 00.0% |
| 28 BEAMS | 6580 | 12.5% |
| 24 BEAMS | 5640 | 25.0% |
| 20 BEAMS | 4700 | 37.5% |
| 16 BEAMS | 3760 | 50.0% |
| 12 BEAMS | 2820 | 62.5% |
| 8 BEAMS | 1880 | 75.0% |
| 4 BEAMS | 940 | 87.5% |

FIG.12

BANDWIDTH REDUCTION WITH BEAMFORMING AND DATA COMPRESSION

TECHNOLOGICAL FIELD

The described invention relates to beamforming in wireless communications, and are particularly valuable for systems with a high number of antennas such as are anticipated for 5G and C-RAN systems now under development.

BACKGROUND

Acronyms used herein are listed below following the detailed description. Further advances in wireless communication are being developed for 3GPP New Radio (commonly referred to as 5G) and also for centralized (or cloud) radio access networks (C-RAN) which is a recent extension to the 4G/LTE system, and there are some overlaps between these two research directions. Both are to provide high spectral efficiency and energy efficiency while reducing capital and operating expenditures as compared to currently deployed radio access systems. In relevant part two main components of the traditional radio base station, the baseband and the radio head, are physically separated to dispose the higher-maintenance baseband unit (BBU) at a centralized location while the much lower-maintenance remote radio heads (RRHs) are mounted on rooftops, towers, etc. up to several kilometers away. Typically the link between them is fibre (one in each direction) to avoid the large power losses inherent with long runs of coaxial cables.

For C-RAN systems, the front haul (FH) is defined as that transmission link between the BBU and the RRH, and is shown at FIG. 1 which is a schematic overview of an example radio environment. This link 25 is referred to as front-haul regardless of the direction the data moves to distinguish it from the backhaul link that goes between the BBU and the core network. In the 5G system the BBU 20 may or may not be co-located with a serving radio access node termed a gNB whose coverage area is delineated by the dotted line. In some deployments there may be multiple RRHs associated with a single BBU 20 or multiple interconnected BBUs, and the front haul link 25 between the BBU(s) 20 and any given RRH may be wired or wireless. The illustrated UE 10 is in direct communication with the RRH 30, which in the 5G system would be operating as a transmission/reception point (TRP) of the gNB itself. Typically the RRH 30 will not have sufficient hardware to process radio-frequency (RF) signaling to baseband and vice versa. The RRH will typically contain the base station's RF circuitry plus analog-to-digital/digital-to-analog converters, up/down converters, amplifiers filters and the like. For downlink data the BBU translates the data stream coming from the core network to a form that is suitable for transmission over the air, or close to it depending on the hardware and processing capacity of the RRH. The reverse is true on the uplink where the RRH does minimal signal processing, though in some deployments the RRH may have partial though incomplete baseband processing capability. This is the form of the data sent over the FH link 25. For C-RAN the FH link 25 is termed a Common Public Radio Interface (CPRI) and it is standardized (see www.cpri.info, last visited Dec. 7, 2016) to facilitate inter-operability of BBUs and RRHs from different manufacturers. The CPRI specification uses the terms radio equipment control (REC) and radio equipment (RE) in place of BBU and RRH, respectively, but these teachings are not limited to C-RAN and 5G systems so will use the more generic terms BBU and RRH.

The C-RAN and 5G systems are to use a much larger number of antennas than currently deployed systems such as 4G/LTE. The FH link 25 will therefore require a very large bandwidth when more and more antennas are added to the system to improve performance. For example, if a traditional LTE system has 8 transmit (TX) and 8 receive (RX) antennas, increasing this to 128 antennas will increase the bandwidth required for transmission of data between the BBU 20 and the RRH 30 by a factor of 16, all else being equal. The 5G system is expected to use even more than this number of antennas making the bandwidth problem even more acute. Bandwidth reduction on the FH link 25 is a challenge for C-RAN and 5G.

One practical problem associated with reducing bandwidth on the FH link 25 is to maintain the guarantee that data transmissions between the BBU and RRH will not have any unacceptable delay; many other specifics of signal processing and message exchange depend on a prescribed maximum latency so merely accepting a delay in the data is not a simple solution. Beamforming may reduce the bandwidth requirements, where the transmission between from the RRH to the BBU is beam-space data after a number of beams are properly selected. Many beamforming techniques are known: static cell-specific; adaptive cell-specific; averaged user-specific; instantaneous user-specific; and the like. For example, for static cell-specific beamforming each cell forms a number of orthogonal beams depending on how many antennas this cell has; this is a simple technique to implement. One key challenge in any beamforming technique involves choosing the proper beams.

Another bandwidth reduction technique is data compression which reduces the number of bits in the data transmission between the BBU and RRH. With traditional data compression the is nearly always some performance degradation, most acutely for lower numbers of bits. Typically, data compression techniques reduce bit-rate by identifying and eliminating either statistical redundancy or unnecessary information bits. These are widely used for audio and video data, but traditional data compression methods cannot be directly applied for the FH link bandwidth reduction problem because the frequency domain data is white noise such that there is no statistical redundancy and all of the bits are equally important. Typical prior art data compression methods are µ-law and A-law compression that reduce dynamic range of signal, primarily using eight bits. To reduce FH bandwidth with beamforming one needs to do so on the BBU↔RRH link without an appreciable performance degradation.

As FIG. 1 illustrates, in a practical deployment of C-RAN and 5G typically there will be several or many RRHs per BBU or group of BBUs. Increasing the number of RRHs as well as the number of antennas on those RRHs rapidly increases the amount of data to be transmitted via the front haul links 25. This increased data can create a limitation to the overall system if the front haul link is not ideal, and further can increase power consumption of the radio system.

SUMMARY

According to a first aspect of these teachings there is a method that, for a given user equipment, selects a subset of a plurality of beams based on received energies of the plurality of beams; and thereafter transmits on a front haul link only data from the selected subset of beams.

According to a second aspect of these teachings there is a computer readable memory storing computer program instructions that, when executed by one or more processors, cause a host apparatus such as a RRH or BBU to perform actions comprising: a) for a given user equipment, selecting a subset of a plurality of beams based on received energies of the plurality of beams; and b) transmitting on a front haul link only data from the selected subset of beams.

According to a third aspect of these teachings there is an apparatus such as a RRH or BBU for transmitting data over a front haul link. The apparatus comprises at least one computer readable memory storing computer program instructions and at least one processor. The computer readable memory with the computer program instructions is configured, with the at least one processor, to cause the apparatus to perform actions comprising: for a given user equipment, select a subset of a plurality of beams based on received energies of the plurality of beams; and transmit on a front haul link only data from the selected subset of beams.

BRIEF DESCRIPTION OF THE DRAWINGS

FIG. 10A is a more detailed view of processing blocks for the C-RAN architecture of FIG. 6, with no beamforming.

FIG. 10C is similar to FIG. 10B with the fixed beamformer from FIG. 9 added to the FFH side of the FH link.

FIG. 11B is a plan view illustrating that cell's antenna beam pattern.

FIG. 11C is similar to FIG. 11A but showing the UE received beam patterns after beamforming.

FIG. 12 plots tabular data comparing bandwidth savings for two different cell scenarios.

DETAILED DESCRIPTION

Various beamforming techniques are well known in the art for the link between the radio access network itself and the UE. Traditionally, the selection of beams after cell-specific orthogonal beamforming is based on a signal to interference plus noise (SINR) calculation done after the channel estimate, and that channel estimate requires a demodulation reference signal (DMRS) of each UE. Adopting this technique for the FH link 25 would significantly increase complexity and introduce unacceptable extra delays in the data transmission from the RRH to the BBU. Additionally, this problem will be even more severe with cooperative multipoint (CoMP) where each RRH would need to send beam-space data to their serving cell/BBU.

Embodiments of these teachings do not require channel estimates on the FH link. Not only does this avoid extra delays on this link between the BBU and the RRH, it significantly reduces deployment costs for the system. A more specific non-limiting embodiment further reduces the front-haul bandwidth requirement by what is described below as aperture selection, in which the beams selection is not fixed but dynamically changed for each user.

The broad aspects of the invention described below can be summarized as a beam selection aspect and a data compression aspect. These can be used separately, but for maximum reduction of bandwidth on the FH link 25 they can both be employed. Of course, the data compression can also be used in the downlink direction when the BBU 20 sends user data to the RRH 30 over a similar link 25.

Figure 1:
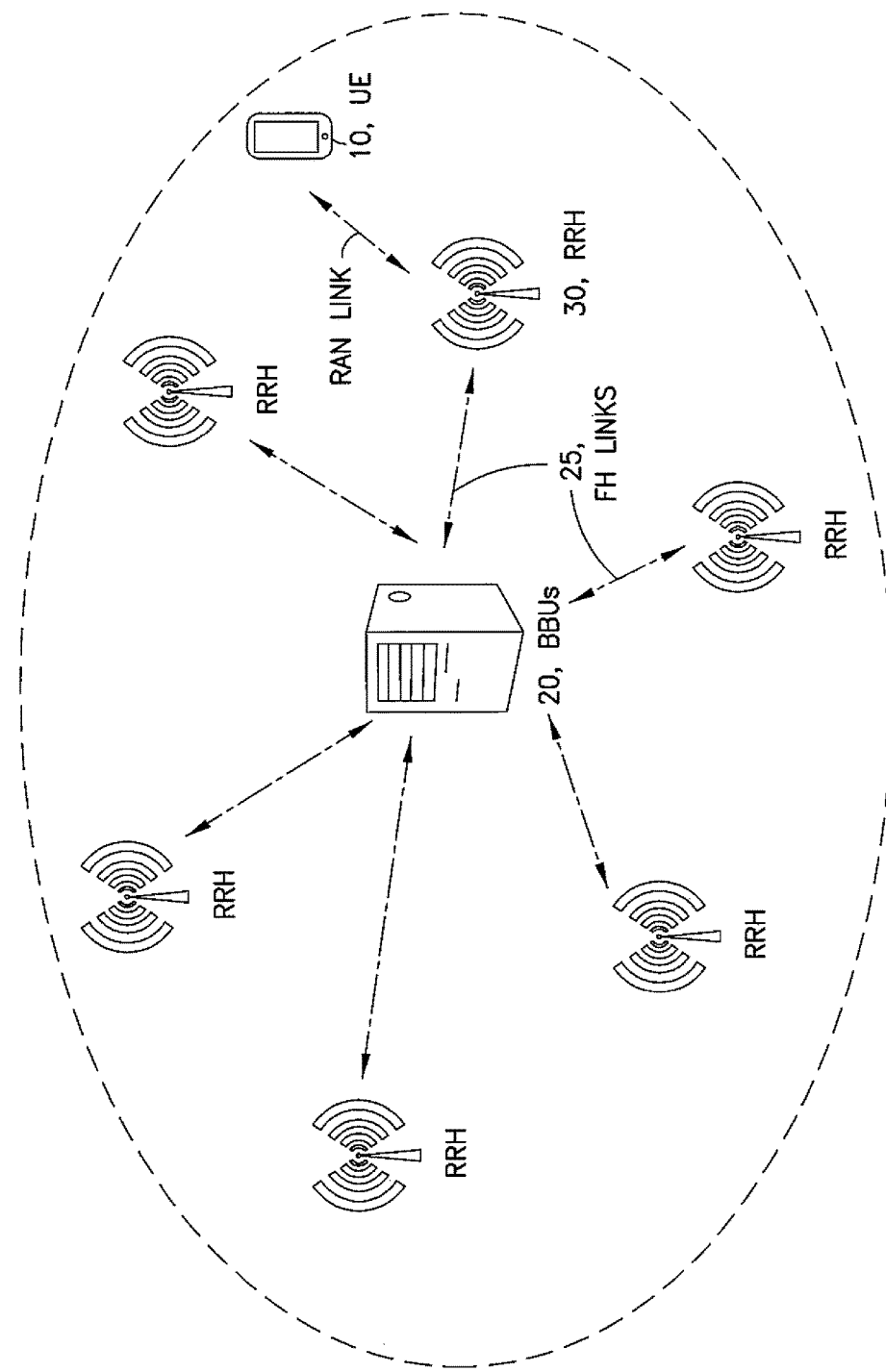
FIG. 1 is a schematic diagram illustrating an example radio environment in which embodiments of these teachings may be practiced.

In the beam selection technique each RRH can make the selection of which of the beams should be transmitted to the central module, which is the BBU in FIG. 1. So for example if we assume the LTE upper limit of 8 antennas, in this aspect instead of sending 8 beams the RRH may select the 3 strongest beams and send those to the central module. Different from prior art beamforming techniques, this beam selection does not require the transmission of DMRSs or the computation of any channel estimates on the front-haul link, but instead can be based on the strongest received energy of the beams per user.

The data compression aspect of these teachings is particularly adapted for the link from the RRH to the BBU in that this compression does not appreciably degrade the data being transmitted. It deals with the beam-space data, and more specifically chooses a gain offset value for each of the selected beams based on that beam's receive energy. This selected gain offset value corresponds to the minimum quantization error. In an embodiment this gain offset value also depends on the number of bits used for the data compression, so for example there will be a higher gain offset value if 8 bits are used for compressing the data and a lower gain offset value if 4 bits are used for compressing the data.

Figure 2:
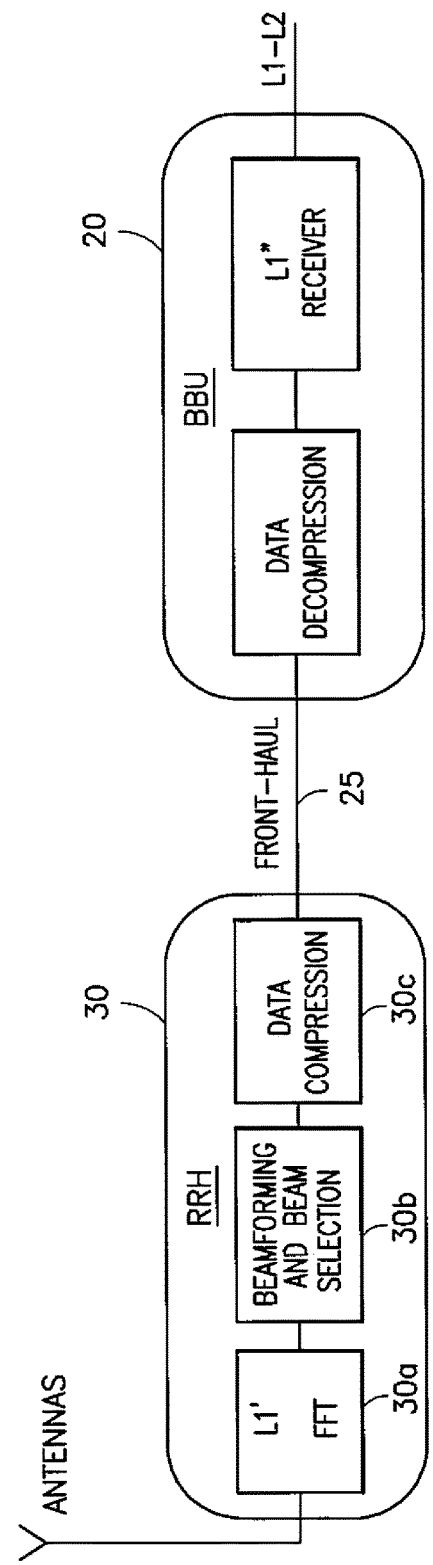
FIG. 2 is a schematic diagram showing the front-haul architecture of a cloud-based radio access network (C-RAN) with beamforming and data compression.

FIG. 2 illustrates a schematic view of the RRH 30 and BBU 20 shown at FIG. 1 but showing certain of the relevant functionality. The RRH 30 has the antennas that communicate directly with the UE 10. Data uplink from the UE enters FIG. 2 from the left at the RRH 30 via layer 1 (L1) signaling. The RRH 30 performs a fast Fourier Transform (FFT) 30a, selects beams 30b and if data compression according to these teachings is employed the RRH 30 compresses 30c the uplink data from the selected beams. The RRH 30 sends this compressed data to the BBU 20 over the FH link 25, where it is then decompressed 20a. In general FIG. 2 represents the front haul architecture of a C-RAN system as currently under development, and of course data can flow in both directions on the link 25.

Figure 3A:
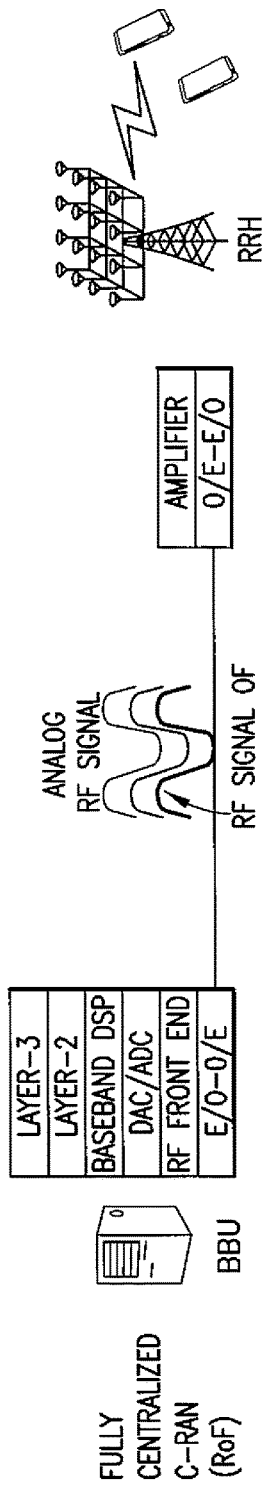
FIGS. 3A-C illustrate schematically three different types of C-RANs, each with different signal processing capabilities at the remote radio head (RRH).
Figure 3B:
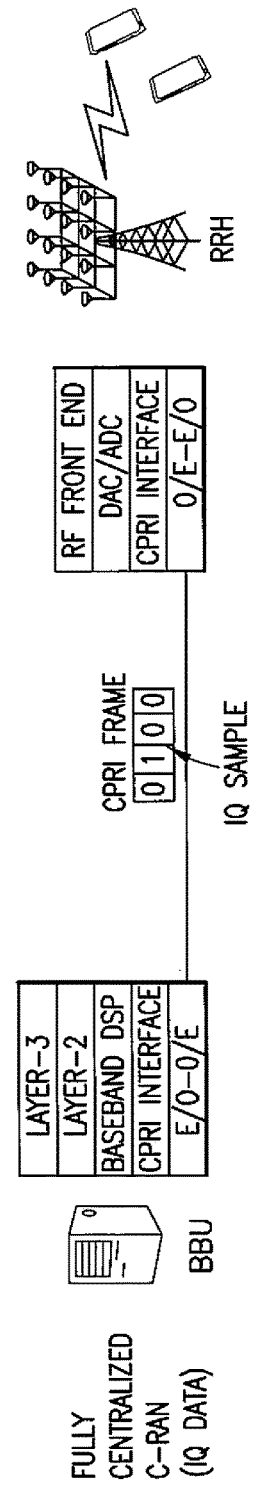
Figure 3C:
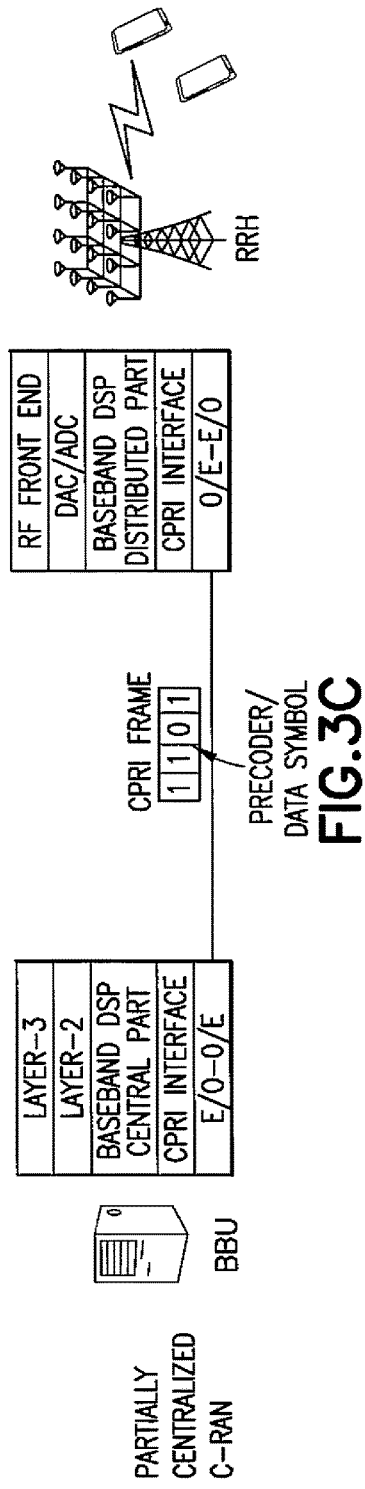

The C-RAN deployment can have varying degrees of centralization in the BBU. FIGS. 3A-C illustrate three different types of C-RANs, each with the RRH at the right and the BBU at the left. In a fully centralized C-RAN at FIG. 3A the RRH is little more than an amplifier and the FH link to the BBU is analog carrying the RF signals of each of the RRH's antenna. FIG. 1A is not very practical for wide scale deployment due to its very large bandwidth requirements on the FH link. In the fully centralized I/Q data C-RAN at FIG. 3B the RRH additionally has a radio frequency front end RF FE as well as digital-to-analog converter (DAC) and analog-to-digital converter (ADC) so the signal the RRH sends to the BBU is digital in-phase and quadrature bits. Finally, the partially centralized C-RAN at FIG. 3C has the RRH with some (but incomplete) baseband digital signal processing (DSP) capabilities; in this case the signal on the FH link to the BBU can be in the form of encoded symbols as shown. In all cases the RRH is limited to processing, to varying extents, of only L1 signaling while the BBU handles all layer-2/layer-3 (L2/L3) processing. The C-RANs of FIGS. 3B-C have some processing capability at the RRH which allows flexibility in addressing bandwidth issues on the FH/BH link.

In heterogeneous C-RANs where many macro-RRHs and small-RRHs are equipped with many antennas, the network-wide front haul data drastically increases as cell density increases or the number of antennas are scaled up. In-phase/quadrature (IQ) data compression can do this as at FIG. 3B, but the IQ-sample data can be reduced at the cost of distortion in reconstruction of baseband signals and additional complexity both in the BBU pool and RRHs. Advanced multiple-input-multiple-output (MIMO) techniques can be employed to reduce the number of active antennas, only the selected set of antennas can be used for radio signal transmission, or limited radio frequency (RF) chains can be used with two-stage precoding techniques that may be used in the case of FIG. 3C where long-term RF-precoding for antenna elements is performed at the RRHs and short-term baseband-precoding for RF-chains is performed at the BBU pool.

Beamforming by selecting the best beams from among a plurality of beams is sometimes referred to as a switched beam system (SBS) that assumes a base station is using multiple beams to cover the whole cell, for example 3 beams each with bandwidth 120° or six beams each with bandwidth 60°, where each beam is treated as a separate cell once the base station's whole cell is divided into sectors. These multiple beams are formed by a SBS system that has a beamformer which forms the multiple non-adaptive beams, a sniffer which determines which beam has the best SINR for a given receiver, and a switch that selects the one or two best beams for that receiver.

Embodiments of these teachings dynamically select a number of beams for each user based on the received energy of each beam after cell-specific beamforming. This does not require channel estimates and pilot information of each user and therefore does not introduce extra delays in the data transmission between the RRH 30 and the BBU 20. Selecting a reduced number of beams can significantly reduce the bandwidth requirements for the FH link 25. For example, no matter how many antennas there are per cell, the required bandwidth could be the same as the maximum LTE number of 8Tx/8Rx antennas without beamforming where a fixed 8 beams are selected for each user. If there are 128 antennas per cell in a C-RAN or 5G deployment this would mean a 16× bandwidth reduction.

Data compression can add to this bandwidth reduction. For example, on the uplink (from the UE) all the antenna data received at the RRH 30 can be transformed to beam space data after the RRH 30 performs a FFT. The proper beams are selected for each user as above (or by any other beamforming technique) and each selected beam is then compressed before being sent on the BH link. From the BBU's perspective the received beam space data is firstly de-compressed, followed by conventional receiver signal processing such as channel estimating, data combining for all the beams and decoding.

As will be detailed further below, embodiments of these teachings provide a variety of technical effects. Due to the simple beam selection method deployments of these teachings do not introduce additional delays in the signal transmission between the BBU and the RRH since no channel estimates are needed; channel estimates are associated with a high computational complexity. The beams are dynamically selected, and different numbers of best beams can be dynamically selected, based on different user locations (that is, close to the cell center or nearer the cell edge) where that location is reflected by the received beam energy. This implies a more effective bandwidth reduction and better system performance. With this beamforming technique, the received energy is very likely to be different among the selected beams of a given user, and prior art data compression techniques are not well suited for compressing data received on beams with different energy.

Figure 4A:
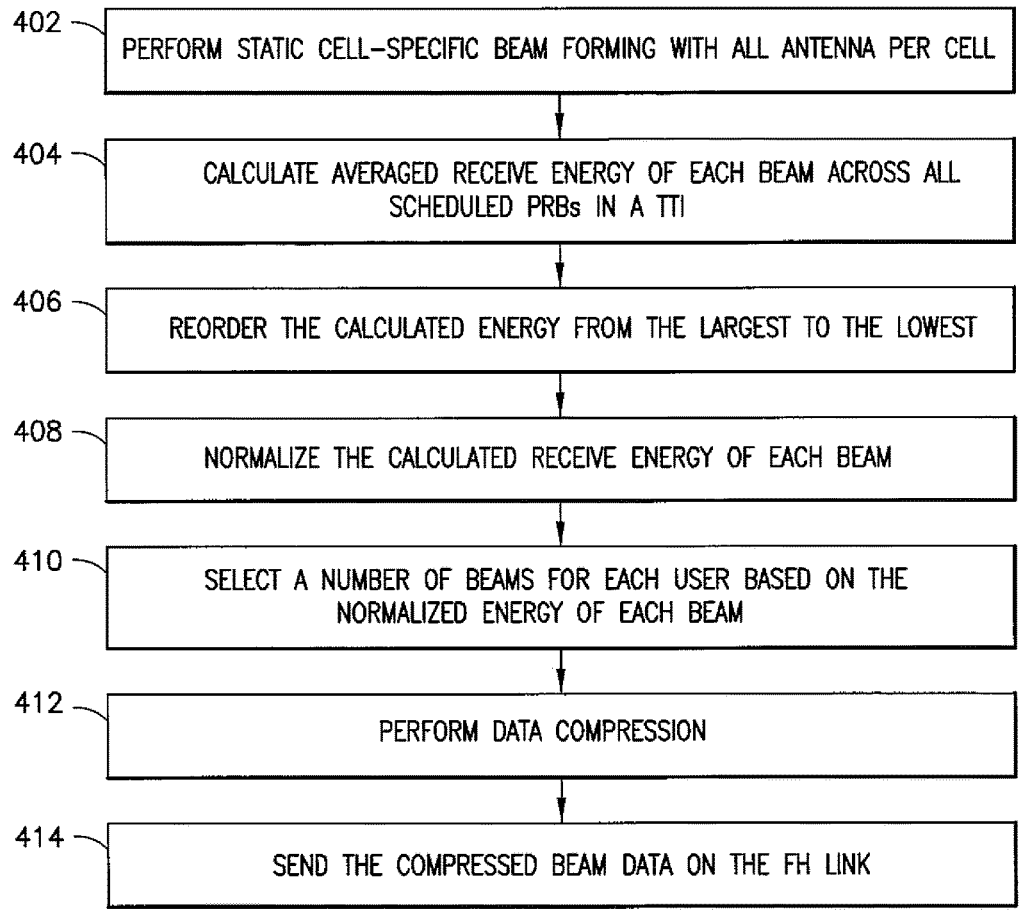
FIG. 4A is a process flow diagram summarizing certain of the teachings herein from the perspective of the RRH for reducing bandwidth requirements on the link between the RRH and the BBU.

FIG. 4A is a process flow diagram that outlines some of the major steps for implementing both the beamforming and data compression aspects of these teachings to reduce bandwidth requirements on the FH link. In this description assume the RRH 30 receives data from a given UE 10 on multiple beams and forwards this data, after the processing described at FIG. 4A, to the RRH 20 for further processing there. In that regard FIG. 4A reads from the perspective of the RRH 30. There may be multiple UEs 10 communicating with the same RRH 30 and FIG. 4A applies for each of them separately; that is, selecting the best beams is per user, not a selection of the best beams when the beams are aggregated across multiple users.

As mentioned above, these teachings are particularly advantageous for deployment in 5G and C-RAN systems though these are preferred deployments rather than a limitation on the broader teachings herein. Additionally, while FIG. 4A includes both beamforming and data compression, either of these aspects of these teachings can be employed separate and distinct from one another; for example in one deployment the RRH can perform the beamforming described herein to reduce bandwidth requirements on the FH link without also using the data compression aspects, while in another deployment a different RRH can perform the data compression described herein to reduce bandwidth requirements on the FH link while not also utilizing the beamforming aspects detailed herein (in this latter deployment the RRH may for example use any beamforming technique or none at all).

With these qualifiers as to the scope of its teachings, now consider FIG. 4A where the process begins at block 402 in which the RRH 30 performs static cell-specific beamforming with all antennas per cell. For example, if a cell has 16 antennas, we will have 16 beams where each beam is orthogonal to each other and those 16 beams together cover all users in the cell. For example these 16 antennas are statically beamformed by each covering 22.5° of the 2-dimensional 360° cell (note that at least for 5G beamforming may be in 3-dimensions where there is a vertical element to the antenna/beam coverage region). If instead that 360° cell covered 3 sectors with 16 antennas per 120° sector, then the static beamforming can have each antenna covering some portion of a given 120° sector even if each is not an identical 7.5° sweep. Also, other options are possible and the number of antennas/sector can be different; for example with a 3-dimensional cell there can be a vertical split in which some antennas cover an inner portion of the cell/sector while others cover an outer portion of the cell/sector. Further, an active antenna can be used instead of separate antennas to create multiple beams.

Next at block 404 the RRH calculates the averaged receive energy of each beam across all scheduled physical resource blocks (PRBs) in one transmission time interval (TTI). This is only an example; there may be an averaging window different than one TTI, and other radio access technologies may or may not employ the PRB and/or TTI concept. Bock 406 has the beams re-ordered from highest energy to lowest. For the 16 beam example above, for this step they may considered as being placed in a list that is rank-ordered by average received energy. Because this is for all 16 beams neither the list nor the ordering is specific to any user but reflects all users in the cell since the rank-order lists all beams in the cell. Next the calculated receive energy of each beam in the list is normalized at block 408, for example by dividing the energy by summarized values of all the beams. If we assume the beam energies are normally distributed this normalization can simply take a standard score per beam z as the averaged energy of that beam x less the mean energy across all beams divided by the standard deviation across all beam energy averages $\sigma$ $[z=(x-\mu)/\sigma]$. Normalizing different types of distributions are well known in the art. Now the RRH 30 has a list of all beams in the cell, rank ordered by average received energy and normalized against one another.

It is at this point we make the beam selection on a per user/UE basis, based on the normalized energy per beam as block 410 states. This is done in different ways for different embodiments. In one embodiment there is a fixed/pre-defined number of beams to select per user, for example 3 beams. For this fixed beam selection the RRH 30 would select that predefined number of beams based on normalized energy of each beam: the first selected beam will correspond to the largest normalized receive energy for this user, the second selected beam will correspond to the second normalized receive energy for this user, and so on. Note this is per user, so in the example list of 16 beams the highest energy beam on the list will not be selected unless that particular beam is carrying data from this user. Since this selection is based on the received energy of each beam (after averaging and normalizing), it does not require any pilot information of each user and the RRH does not need to perform any channel estimate as would be the case for prior art beamforming selection techniques. It is this feature that greatly reduces the cost of implementing the FH link between the RRH 30 and BBU 20 as well as avoiding added delays on that link.

Different from the fixed beam selection, we refer to the other beam selection embodiment as aperture selection in which the RRH 30 dynamically selects a number of beams for each user that satisfies a predefined normalized total receive energy. As an aperture selection example, assume some predefined normalized total receive energy; the RRH has the normalized list from block 408 and so for each given user it selects a number of beams such that the sum of all normalized energy of the beams selected for a given user is greater than or equal to 80 percent of that predefined value (that is, select the minimum number of beams per user to meet this criteria). In this aperture selection technique it may be that in a given TTI an individual RRH 30 serving 4 users selects two beams for user 1, two beams for user 2, four beams for user 3 and three beams for user 4, all while using the same value for the predefined normalized total receive energy to make those beam selections. As with the fixed beam selection method, this aperture selection method also is based on received energy of each beam and so does not require any pilot information of each user and the RRH 30 need not perform channel estimates.

After a number of beams are selected, data compression is performed at block 412 to further reduce front-haul bandwidth requirement. As mentioned above conventional data compression techniques are not well suited to the data received on multiple beams with different energies. In this regard these teachings provide a data compression technique that relies on minimizing quantization error of the data where that minimizing depends on the energy of the received beam.

Specifically, based on receive energy of each selected beam, calculate or lookup in a table a gain offset value such that the corresponded quantization error is minimum. Preferably the gain offset values can be calculated offline to form a table stored at the RRH so as to minimize computations the RRH needs to perform dynamically. For example, this table is ordered from the lowest receive energy to the largest receive energy. For actual observed receive energy, a nearest gain offset value in the table can be identified. These gain offset values further depend on number of bits used for data compression, so for example an 8-bit data compression would yield larger gain offset values than a 7-bit that is larger than 6-bit which is larger than 5-bit and so on, for data compression. For a look-up table implementation this means there would effectively be different tables for different bit-number compressions. Table 1 below is an example assuming six different beam energies.

TABLE 1 example gain offset values per beam energy, per compression level

| 7-bit compression | | 8-bit compression | |
| --- | --- | --- | --- |
| Beam energy | Gain offset value | Beam energy | Gain offset value |
| E1 | value a | E1 | value g |
| E2 | value b | E2 | value h |
| E3 | value c | E3 | value i |
| E4 | value d | E4 | value j |
| E5 | value e | E5 | value k |
| E6 | value f | E6 | value l |

If 8-bit compression is being utilized and the RRH has a beam whose normalized averaged energy (from the list at block 408 of FIG. 4A) is nearest to E4, it will choose from Table 1 above the gain offset value j for that beam because this is the value that yields the least quantization error when data at energy level E4 is compressed with 8 bits. The RRH will find the appropriate gain value of each of the beams selected at block 410 of FIG. 4A. The table look up implementation can significantly reduce computational complexity to search for the minimum quantization error that results from data compression, as compared to dynamically doing the computations for the actual beam energy since multiple computations would be required to asses which gain yields the minimum error. Such dynamic computations may impose a delay in sending the data on the FH link, a delay the look up table easily avoids.

Exactly what data is most appropriately compressed together can depend on the specific radio access technology. For LTE it is advantageous to perform data compression for each PRB pair; that is, for every different user's PRB pair a different gain offset value is selected depending on the actual observed signal value which may differ among the different user's PRB pairs. This will result in better performance due to the different fading for different user's PRB pairs.

For each different user's PRB pair, the selected gain offset value is applied to the corresponding signal by dividing each I and Q data before performing the actual data compression/quantization. For each different user's PRB pair, the selected gain offset value needs to be transmitted with the compressed data at block 414 of FIG. 4A. For example, in the current example of uplink data from the UE the gain offset values utilized by the RRH 30 will be sent to the BBU 20 for its use in decompressing the data. In an embodiment there is a fixed number of bits used to compress the data of each scheduled user, and this fixed number of bits does not depend on the average PRB beam energy but is signaled between the BBU and RRH by means of the gain offset value. This additional signaling of the gain offset values will add a very small overhead that is negligible as compared to the overhead of traditional data compression. For example, for 8-bit compression this overhead is around 8 bits for every PRB pair.

Data decompression is performed at the receiver side, the BBU in the FIG. 4A example. This data decompression is a reverse process of data compression described above, where the transmitted gain offset value of each PRB pair is applied in the BBU 20 by multiplying after regular decompression. Following the data decompression at receiver side, the BBU will continue the process with the beam space signals.

As mentioned above the data compression can be done with beam selection techniques other than based on the average energy per beam as detailed for FIG. 4A above. For example, it is known to select beams based on the signal to interference plus noise ratio (SINR). In this case the process would be similar to that described for FIG. 4A, except the SINR would be based on results of channel estimating (which are done from demodulation references signals DMRSs transmitted per beam, or some other pilot information for making channel estimates) and the SINR value and average value for all beams across all scheduled PRBs of a TTI would be done at block 404 instead of averaged energy. These values would be re-ordered at block 406 and normalized at block 408 and both the fixed beams and the aperture selection implementations could still be used at block 410 for selecting which beams per user will be transmitted on the FH link 25 after compression at block 412 which will select the gain offset value based on the beam SINR rather than the beam energy.

Figure 4B:
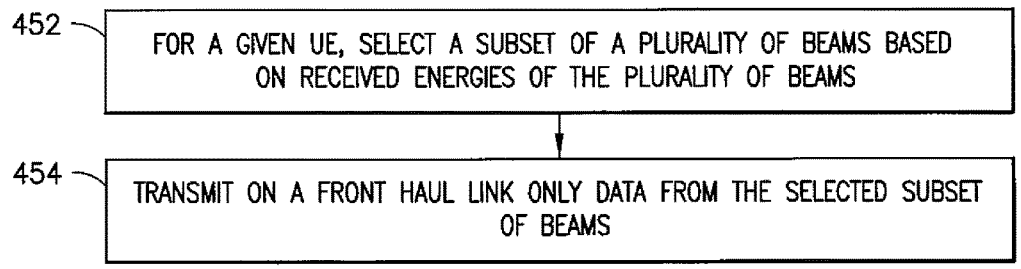
FIG. 4B is similar to FIG. 4A but describes these teachings more broadly.

FIG. 4B is similar to FIG. 4A but describes these teachings more broadly. In this regard at block 452, for a given user equipment there is selected a subset (K beams) of a plurality of beams (M beams) based on received energies of the plurality of beams. Data from only the selected subset of beams is transmitted on a front haul link at block 454. In one embodiment there is a fixed number of beams in which case the subset at block 452 is a predefined number of the plurality of beams.

In an aperture selection embodiment the number of beams in the subset is dynamically calculated. In this case the subset at block 452 is selected by a) normalizing the received energy of each of the plurality of beams; and b) selecting for the subset only those beams for which a sum of their respective normalized received energy satisfies a predefined normalized total received energy. Another way to describe this dynamic subset selection is a) calculating averaged receive energy of each of the plurality of beams where the average is across one TTI; b) normalizing the calculated averaged received energies; and c) selecting for the given UE the subset of beams based on the normalized calculated averaged received energies.

Below are presented two algorithms for computing a dynamic threshold for selecting the beams that will be in the subset at block 452. In general beams are selected for the subset in this case based on comparing the received energies of all the respective plurality of beams to a dynamically calculated threshold energy. One such algorithm shows that the threshold energy is calculated based on total received beam energy for a most recent resource allocation to the given UE, and the other shows it is calculated based on maximum received beam energy for a most recent resource allocation to the given UE.

Since data on the FH link flows in both directions, the process shown at FIG. 4B and detailed herein can be performed by a RRH in which case the data at block 454 from the selected subset of beams is uplink data that is transmitted on the FH link as beam-space data to a BBU for baseband processing. That same process can be performed by the BBU in which case the data at block 454 from the selected subset of beams is downlink data that is transmitted on the FH link to a RRH for transmission over the air to the given UE. For a time division duplex (TDD) system the beam selection results based on the uplink data can be applied on the downlink. For example, the BBU will know from uplink data it received which are the selected beams and can use that knowledge for its downlink data to this same user. For an incoming call to an idle UE there will not be recent uplink data and so in this case the UE can be configured to send sounding signals when setting up its connection to receive the call, which can be used to inform the BBU of the appropriate beam selection. But while the uplink data over the FH link 25 is to be in the beam formed format, for different deployments across different systems the downlink data actually carried over the FH link 25 may differ according to how the L1' functionality is split between the BBU and RRH. Once at the RRH this downlink data will typically be mapped to all the antennas in the system for beam transmission over the air, regardless of beam selection for the given UE. Regardless, the FH link bandwidth savings for downlink data comes generally from the compression technique described herein.

The data compression aspects of these teachings can be readily added to the high-level process flow at FIG. 4B, namely by adding a step that the received energies of each beam of the subset of beams are used to compress the data prior to transmitting at block 454 the compressed data on the FH link. This is not to say the exact same received energy is used to make the final decision which beam goes in the subset and how to compress data from that beam, only that both results are based on the beam energy. For example, normalized averaged beam energy may be used for deciding if the beam goes into the subset and energy per PRB pair per selected beam may be used in deciding which gain offset value to select.

More specifically, one embodiment of the data compression aspect of these teachings uses the received energies of each beam of the subset of beams at block 452 by the following steps: a) for each beam of the subset of beams, select one minimum gain offset value from a set of pre-computed minimum gain offset values stored in a local memory, where the selected gain offset value has an associated energy value that most closely corresponds with the received energy of the . . . respective beam of the subset of beam; b) compress the respective data associated with each respective beam of the subset of beams after dividing I and Q portions of the respective data by the respectively selected one minimum gain offset value; and c) send indications of all of the selected one minimum gain offset values with the compressed data on the FH link.

Figure 5A:
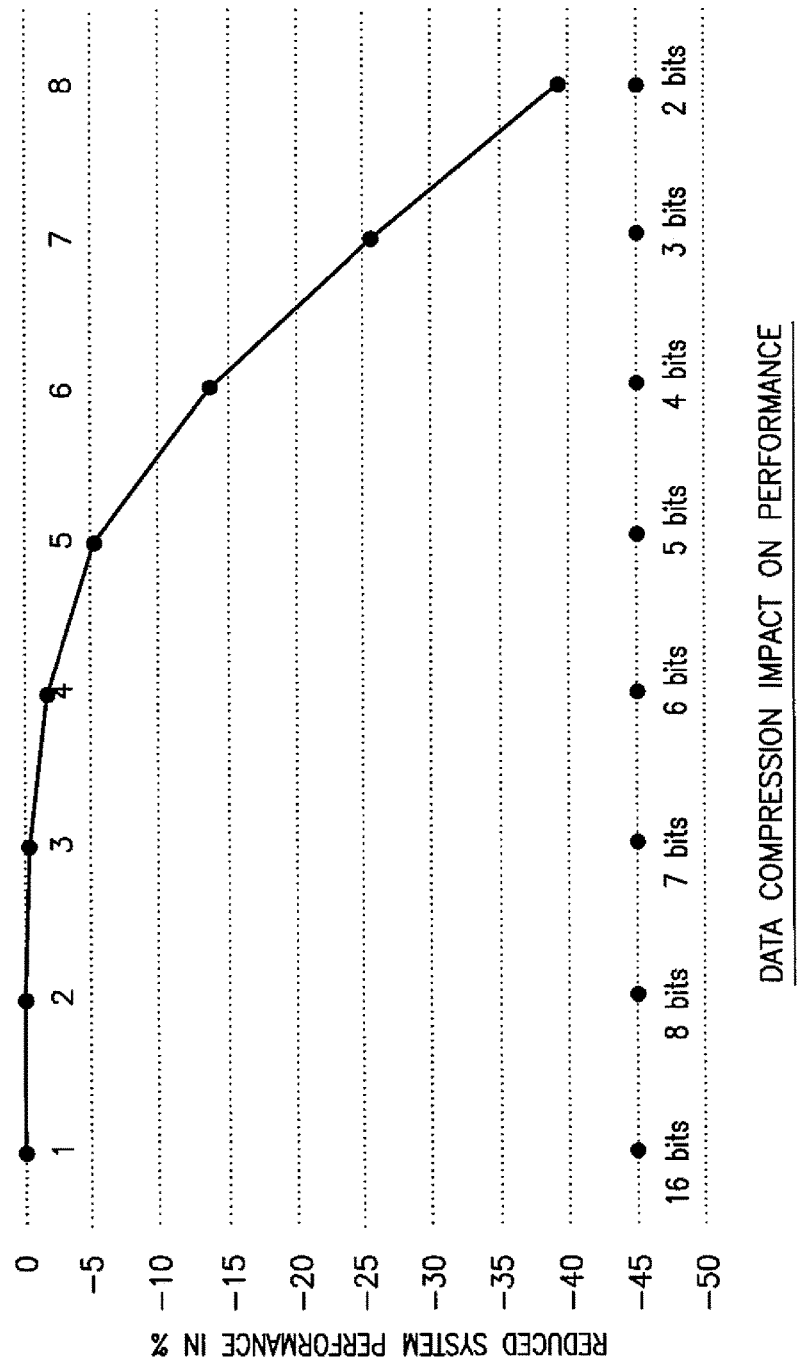
FIG. 5A is a data plot of simulation results showing the impact on performance of different levels of compressing data according to the techniques described herein.
Figure 5B:
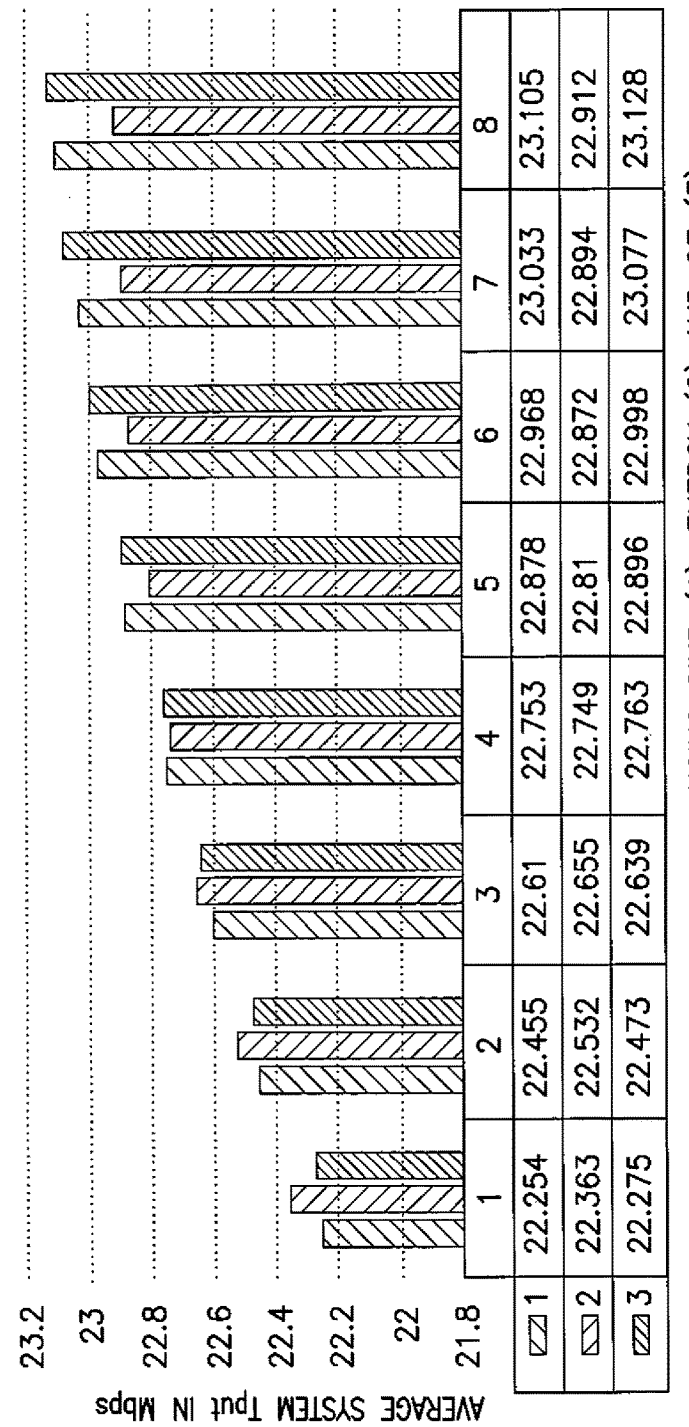
FIG. 5B is a bar chart and tabular data comparing average system throughput in megabytes when the beam selection is by SINR, by energy, and by channel estimates, each with no data compression.
Figure 5C:
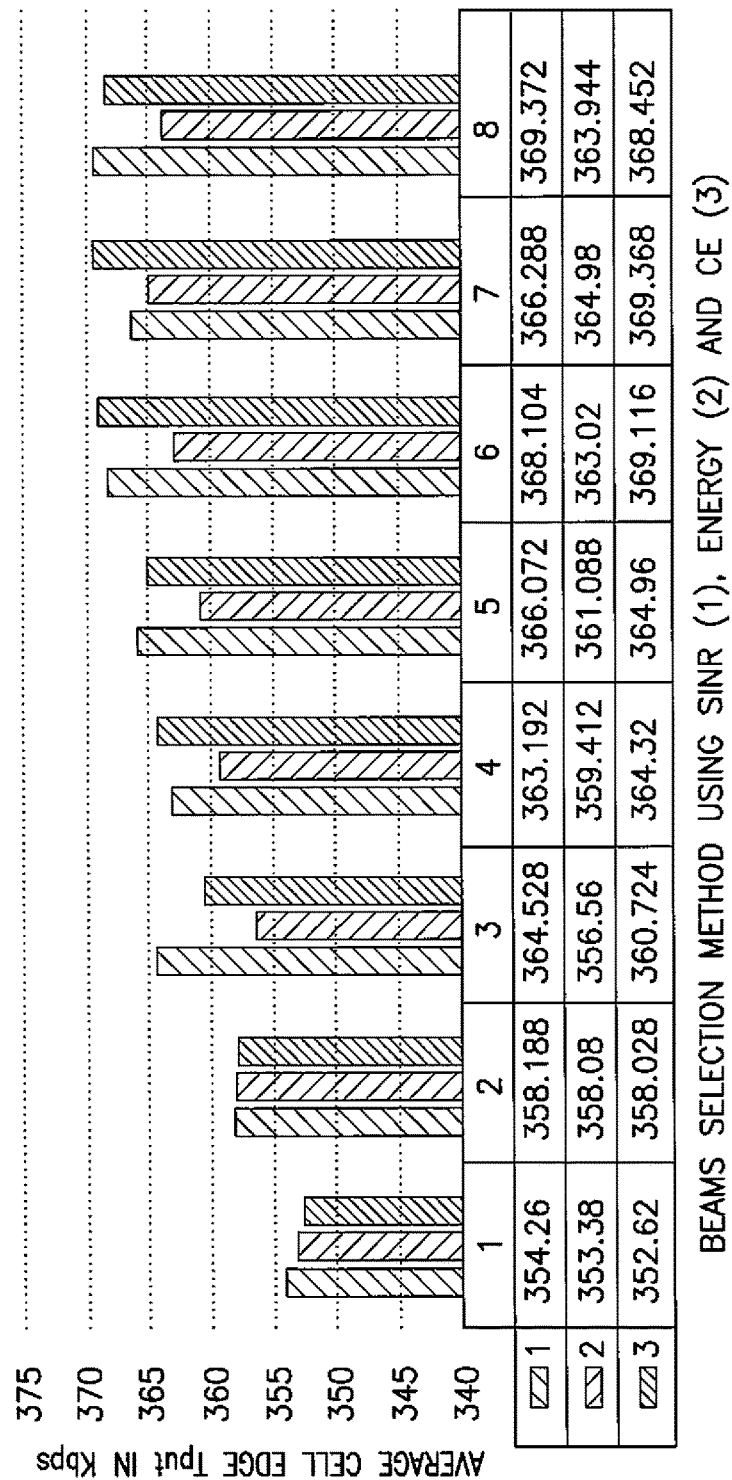
FIG. 5C is similar to FIG. 5B except the FIG. 5C data is cell edge throughput in kilobytes.

FIGS. 5A-C quantify the advantages for the processes detailed above. FIG. 5A is a data plot of simulation results of the impact data compression after beam selection has on performance when the beam selection is based on beam energy. The number of bits used for data compression starting from 16 bits (that is 16 bits for In-phase and 16 bits for Quadrature such that there is a total of 32 bits for each IQ data), then gradually reduced to 8 bits, 7 bits and down to 2 bits. With 8 bits, the performance is almost the same as that without data compression, while for progressively fewer number of compression bits the performance gradually decreases as can be expected. In the prior art μ-law compression primarily only uses 8 bits for uplink with some overhead that is slightly more than the negligible amount described above for these teachings. For example, a 20 MHz LTE system using post FFT 8-bit μ-law data compression requires a bandwidth of 291.2 Mbps while the above-described compression techniques needs 269.6 Mbps for each beam.

FIG. 5B is a bar chart with tabular data below comparing average system throughput in megabytes when the beam selection is by SINR (data set 1 plotted leftmost in each bar chart triple), by energy (data set 2 plotted in the middle of each bar chart triple), and channel estimates (CE, data set 3 plotted rightmost in each bar chart triple). All of these assume 32 antennas per cell and the performance is based on the selected number of beams dynamically changing from one beam to four beams based on the threshold (and without data compression). The eight data sets at FIG. 5B use thresholds 60% (data set 1), 65% (data set 2), 70% (data set 3), and up to 95% (data set 8). For the lower thresholds such as 60%, 65% and 70%, the energy based beam selection described herein performs better than the others.

FIG. 5C is similar to FIG. 5B except FIG. 5C the data is cell edge user throughput, in kilobytes. For cell edge data the SINR channel selection technique is best, but the energy based beam selection described herein performs very nearly as well at the lower thresholds 60% (data set 1) and 65% (data set 2). While FIGS. 5B-C show that the energy based beam selection approach does not outperform the others in all cases, the CE approach is not seen to be a viable option for systems with a bandwidth-constrained FH link and the SINR approach is seen to impose some inherent delays in transferring the data over that FH link as compared to the energy based beam selection approach. In that regard the energy based beam selection described herein is seen to be the better beamforming choice for systems that do have a bandwidth-constrained FH link.

While beamforming is a well-known technology in general, these teachings present a new approach for selecting a reduced set of good beams, particularly in the data aperture selection embodiment detailed above. FIGS. 5B-C demonstrate that this new approach to beam selection provides good performance, in addition to reducing computational requirements as compared to prior techniques and to reducing the bandwidth needed for transmission such as may be necessary in systems constrained by a BBU-RRH link. These advantages make these teachings quite suitable for deployment in C-RAN systems, in 5G systems, and also in any system that utilizes high order MIMO (for example, to enable Edge Cloud Deployments).

The 5G radio access technology is to adopt a high order adaptive antenna system (AAS), which is critical especially for mm Wave technology due to such very high frequency signals being susceptible of line of sight (LOS) blocking. High order AAS and local aggregation of baseband processing in a BBU such as edge cloud deployments makes an efficient FH link critical to the overall system operation. This is true regardless of where the functional 'split' may occur between the BBU and the RRH; while that may be standardized in the CPRI specification it is not yet standardized across all AAS technologies, and for 5G at least there are proposals that this functional split occur at the FFT, at the FFT after beamforming, at the layer-1/layer-2 signaling changeover, and for an asymmetric split at the FFT for uplink data and at the modulator for downlink data. Regardless of where this functional split might be the FH link is better served if the data across it is at a reduced bandwidth with low latency and minimal jitter, it is only the tolerances for these that may vary when the functional split between the BBU and the RRH occurs at different points along the signal processing line.

Figure 6:
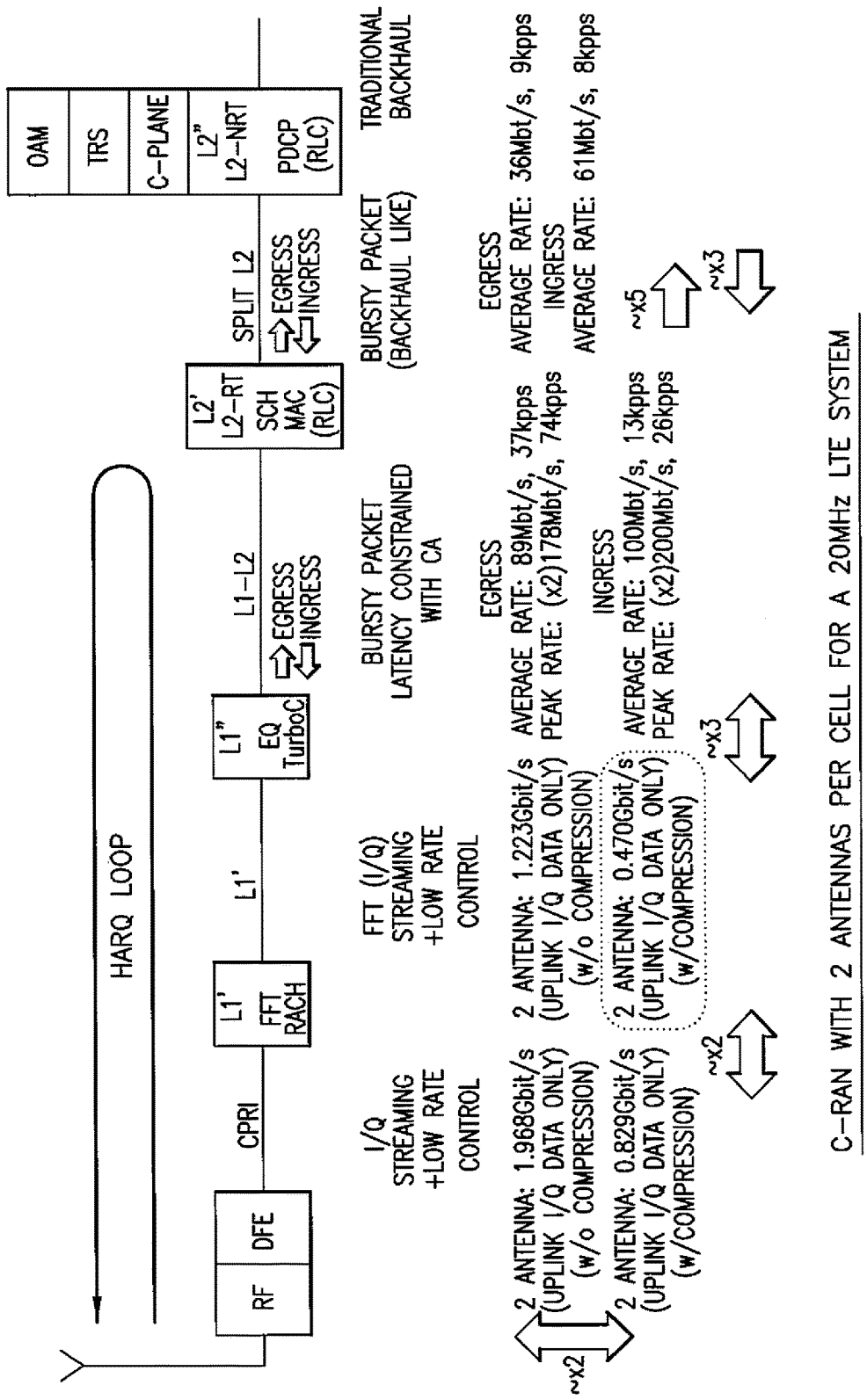
FIG. 6 is a schematic diagram illustrating major signal processing functionality between the antenna and the traditional backhaul to the core network for a C-RAN system.

FIG. 6 is a schematic diagram illustrating major signal processing functionality between the antenna at the left and the traditional backhaul to the core network on the right for a C-RAN system. The standardized CPRI link is disposed between the RF and the FFT; L1 signaling takes the user data between the FFT and the equalization (EQ)/turbo-coding processing blocks, mixed L1/L2 signaling takes it between the scheduler (SCH) and the media-access control (MAC) layer processing, and layer 2 signaling takes what is now bursty packets to the packet data convergence protocol (PDCP) radio link control (RLC) for transport on the actual backhaul link. FIG. 6 assumes a C-RAN architecture with 2 antennas per cell in a 20 MHz LTE radio access system using highly trunked cells operating with carrier aggregation. Average and peak data rates for the various links between these major processing functions are shown in the figure. The illustrated hybrid automatic repeat request (HARQ) loop identifies the most latency-critical region of the signal processing; HARQ signaling typically drives the most demanding latency requirements in a modern cellular radio network.

Figure 7:
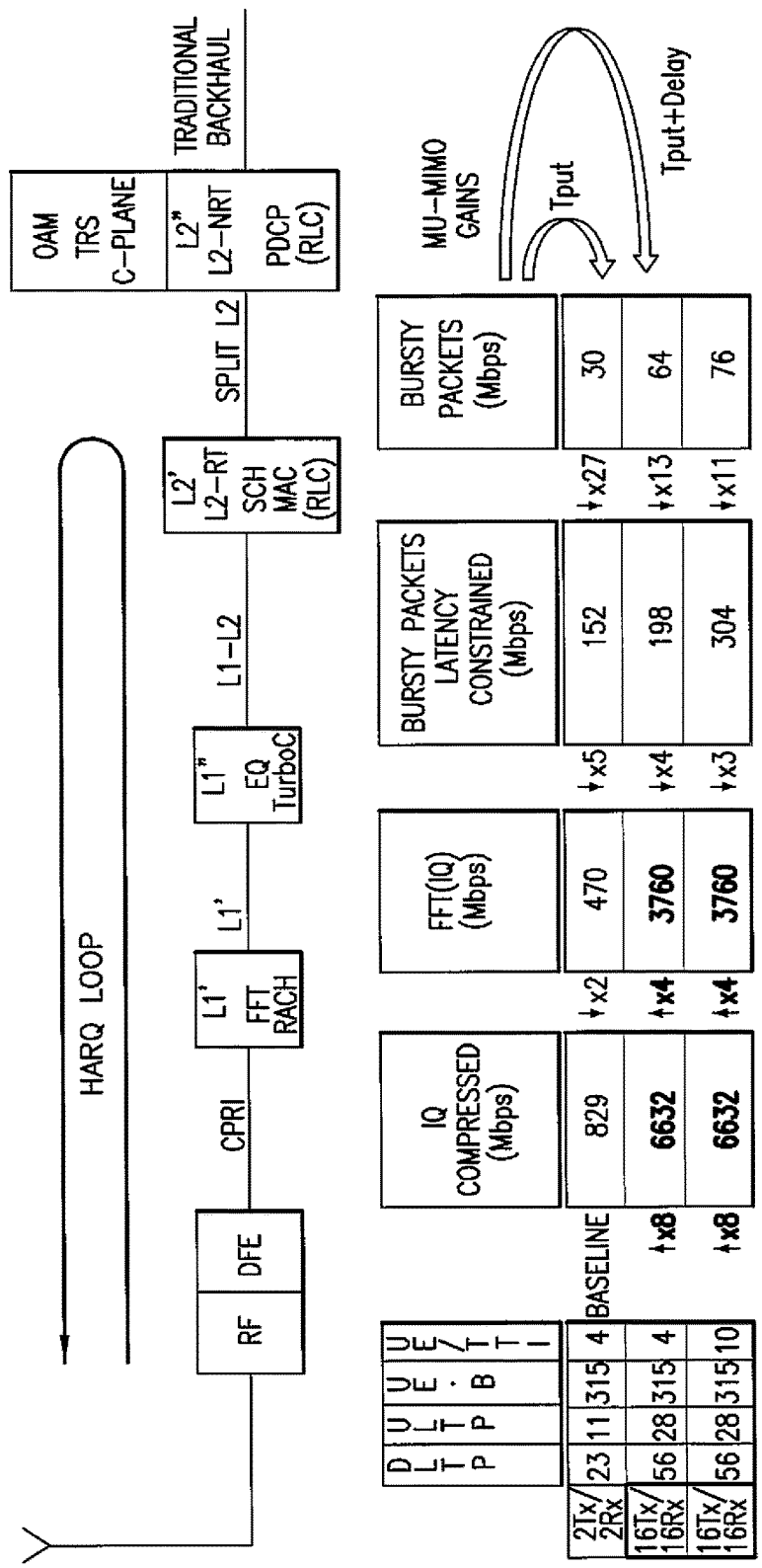
FIG. 7 is similar as FIG. 6 but specifically for processing U-plane data and showing data rates at the various processing blocks for 2 antennas and for 8 antennas.

FIG. 7 illustrates similar as FIG. 6 but specifically for processing user (U-plane) data. There it can be seen baseline data rates at the various processing blocks for 2 antennas (2 TX and 2 RX), as compared to increased throughput for 8 antennas. At the baseline 2×2 antenna system for 4 UEs per TTI the IQ-compressed data needs a bandwidth on the CPRI of 829 Mbps, performing a FFT on that IQ-compressed data reduces the bandwidth requirement to 470 Mbps, equalizing and turbo-coding reduces the bandwidth requirement further to 152 Mbps, which is finally reduced to 30 Mbps when packetized for MAC layer transport. Similar reductions can be seen for the much larger data amounts on the 8×8 antenna systems.

Figure 8:
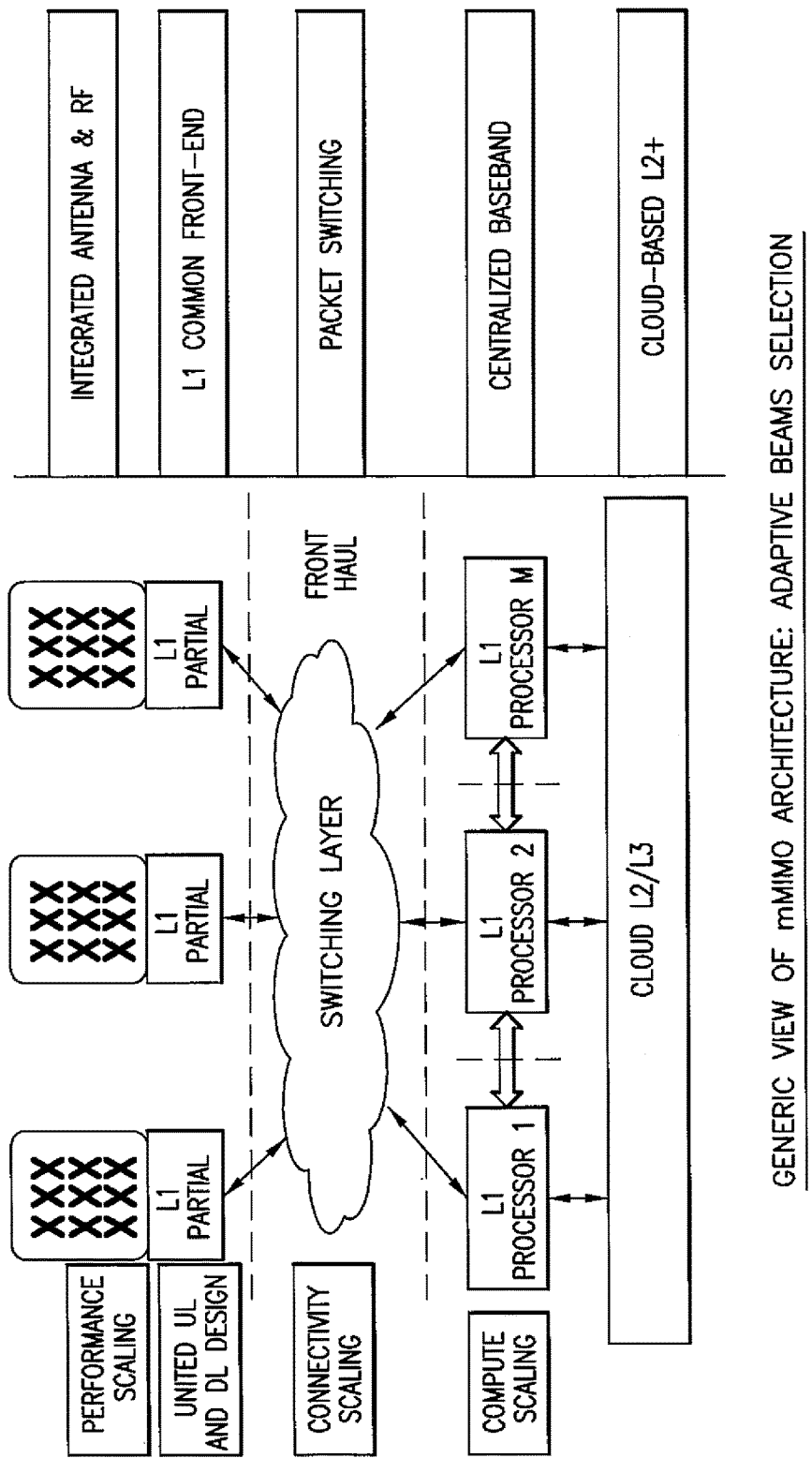
FIG. 8 is a high level schematic view of the processing architecture for a massive MIMO system with adaptive beam selection for 5G radio access networks.

FIG. 8 is a schematic view of the processing architecture for a massive MIMO (mMIMO) system with adaptive beam selection which is likely how 5G radio access networks will be implemented. The antennas are at the top of the drawing and are integrated with RF circuitry and the data from multiple antenna arrays is sent in layer 1 signaling via a common L1 front-end (hardware). This can be considered as the RRH detailed above. L2/L3 signaling is in the cloud, but baseband processing is centralized at what would be the BBU described above. Between them is the front haul as labelled and it is considered a switching layer. But note the scalability built into the 5G architecture.

For the C-RAN architecture shown at FIGS. 6-7, the front haul bandwidth is not scalable in any efficient way, and neither are the RF/DFE chains or the BBU processing power due to the fact that the data volume grows non-linearly with additional antennas. 4G was not designed for the massive scalability that is being designed into 5G as FIG. 8 attests, and C-RAN is a recent addition on top of the pre-existing 4G architecture.

Figure 9:
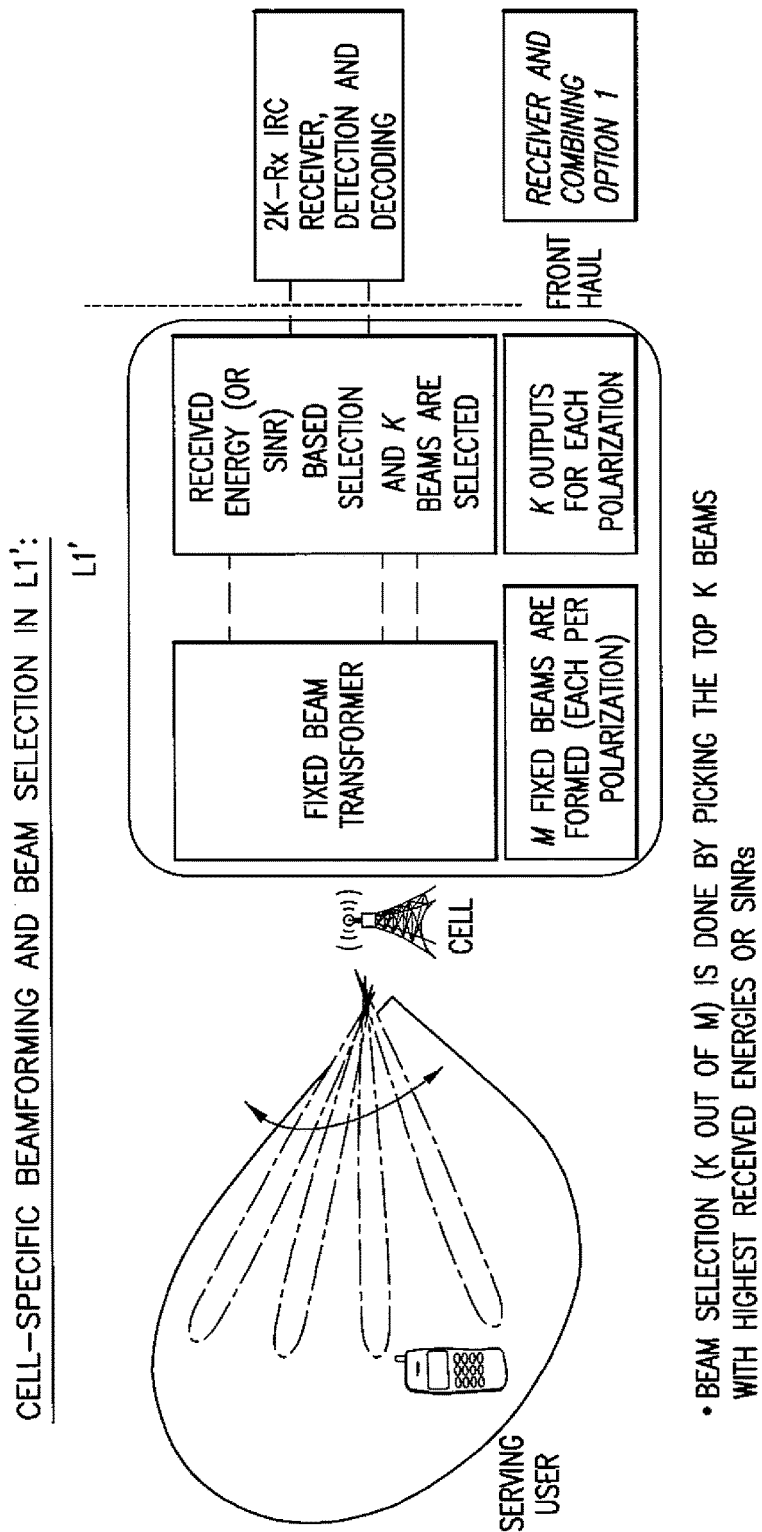
FIG. 9 is a schematic diagram illustrating fixed beam pre-processing for reducing bandwidth requirements on the FH link by energy-based beam selection.

FIG. 9 is a schematic view illustrating fixed beam pre-processing that addresses bandwidth limits on the FH link by energy-based beam selection. The UE is at the left and the cell, a RRH in this case, receives at its antenna array a total of M beams from this user. The data will ultimately be sent over the FH link shown to a receiver (baseband) for detection and decoding. Given the bandwidth limits what is needed is a signal representation basis that keeps all or at least most of the signal energy but in fewer than those M dimensions. Observing this bandwidth limit will also better align the data to be processed with the amount of BBU processing power that is provisioned for a given RRH in the C-RAN system, since a single BBU is expected to serve multiple RRHs. The user's signal is seen on all antennas but if the antenna array is correlated the signal is naturally present only in a few 'look' directions. Each such 'look' directions is a fixed beamformer. FIG. 9 finds those 'look' directions by selecting some smaller subset of K beams from the total M beams for this user, and it makes that selection based on received beam energy since it is a RRH and we want to avoid having to make channel estimates. In this regard using SINR for selecting the K beams is also possible.

FIG. 10A is a more detailed view of processing blocks for the C-RAN architecture of FIG. 6, with no beamforming. In this case the FH link is at the CPRI, and the IQ compressed data for all M antennas is sent over that FH link. All beamforming occurs at the BBU side of the FH link as shown (channel estimation+SINR estimation, antenna selection, and interference rejection combining IRC). The data at FIG. 7 shows this IQ compression alone is not enough of a reduction for transport on the FH link.

Figure 10B:
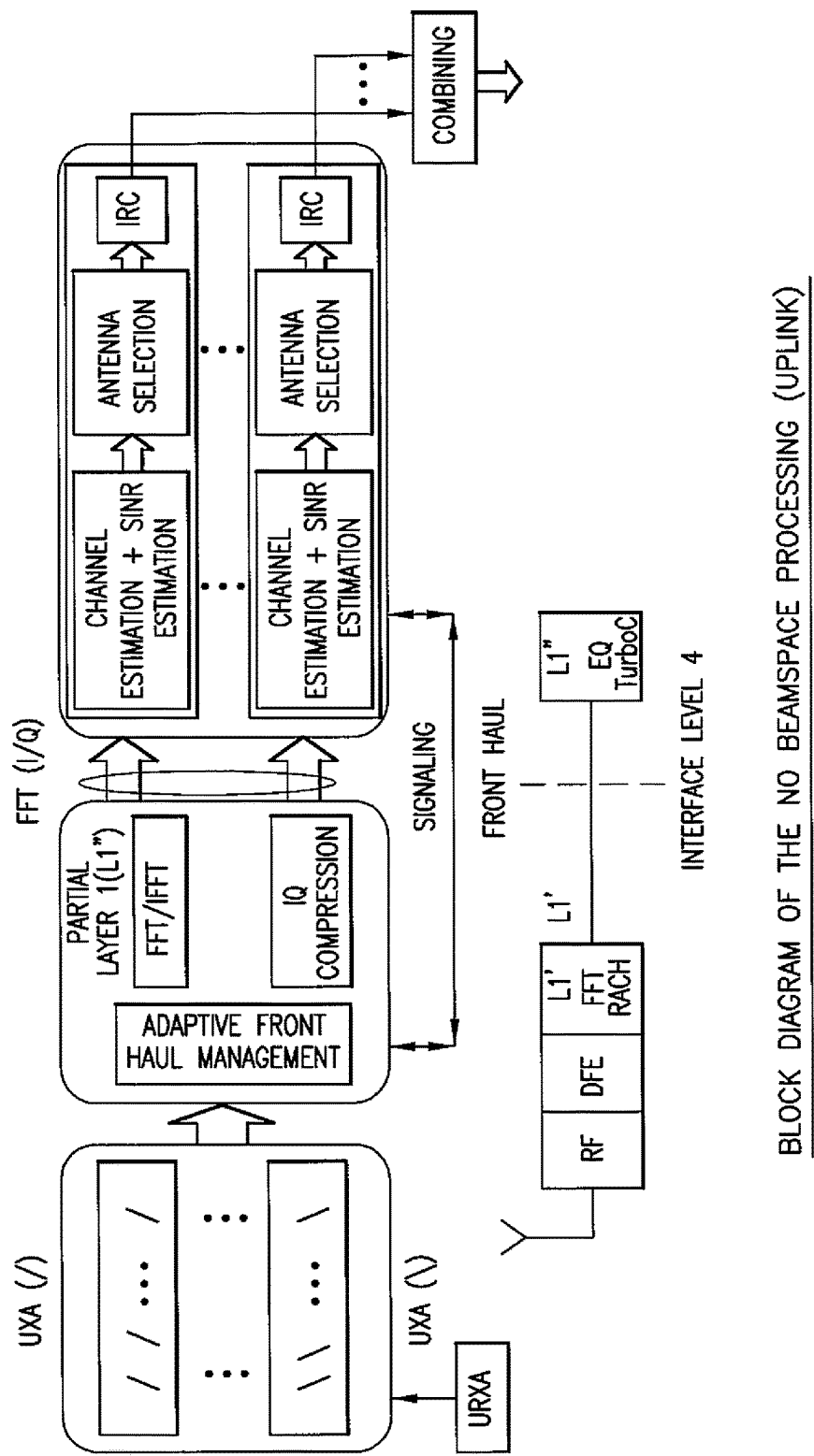
FIG. 10B is similar to 10A except the FFT processing is moved from the BBU to the RRH to reduce bandwidth requirements on the FH link.

The data at FIG. 7 also show that the FFT reduces the data volume, so FIG. 10B is similar to 10A except the FFT processing is moved from the BBU to the RRH and the FH link is now carrying the data after FFT processing. Moving the location of the FH link from FIG. 10A to that shown at FIG. 10B does reduce the data volume per FIG. 7 but additional signaling must be added in order for the BBU of FIG. 10B to do its beamforming since some of the raw signal data necessary for estimating the channel was lost in the FFT/IFFT processing prior to the BBU ever getting it.

Plugging the FIG. 9 fixed beamformer at the RF front end into the C-RAN architecture from FIG. 10B gives the schematic block diagram at FIG. 10C, where the bandwidth reduction on the FH link occurs from a) reducing the total M beams to only K selected beams; b) performing the FFT processing at the RRH side of the FH link; and c) IQ-compressing the data prior to sending it to the BBU. If the BBU is to do full beamforming in FIG. 10C still there will be required some additional signaling from the FFH since it is the FFH that performed the FFT on the data, but in this case the addition is far less than that of FIG. 10B because the additional signaling is only relevant for the K selected beams rather than all M beams.

Figure 11A:
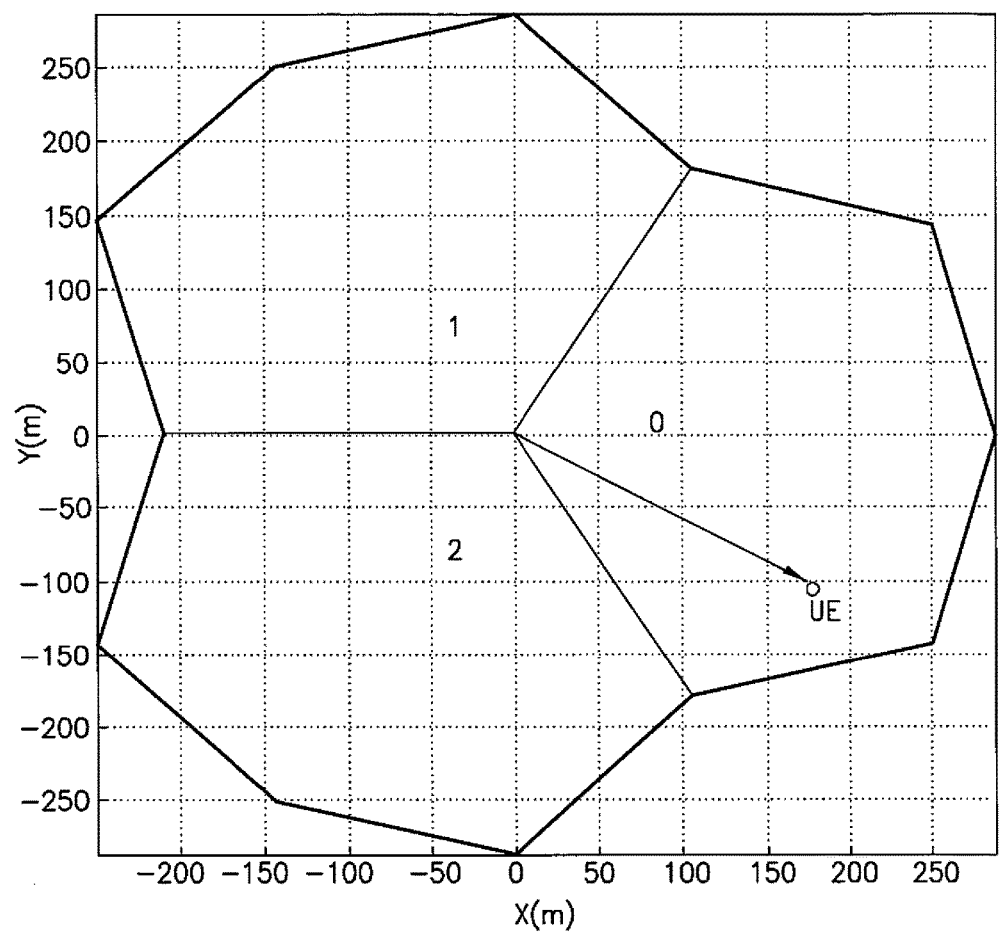
FIG. 11A is a plan view of three cells with only one UE.
Figure 11D:
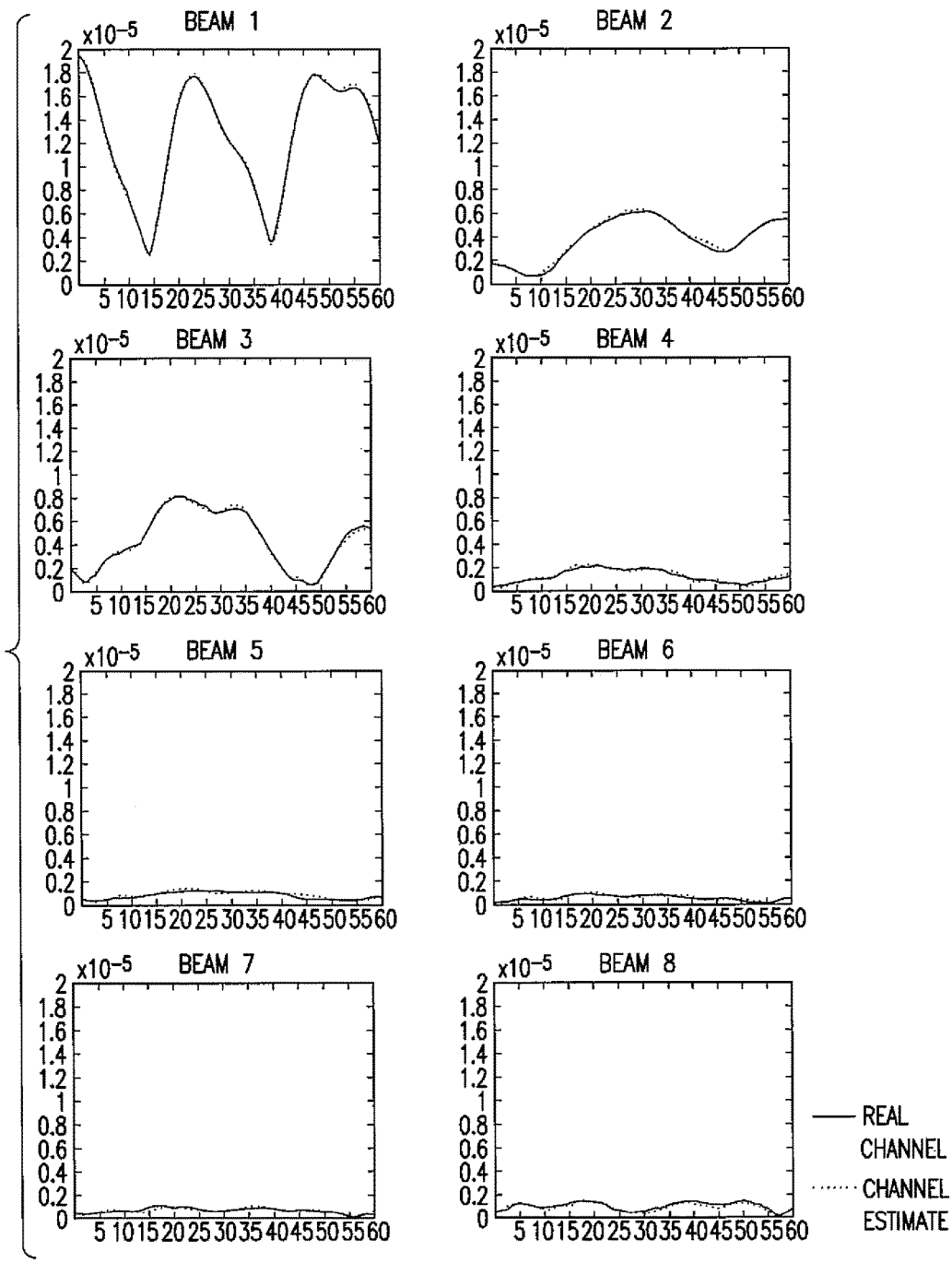
FIG. 11D are data plots of beam energy from FIG. 11D.
Figure 11E:
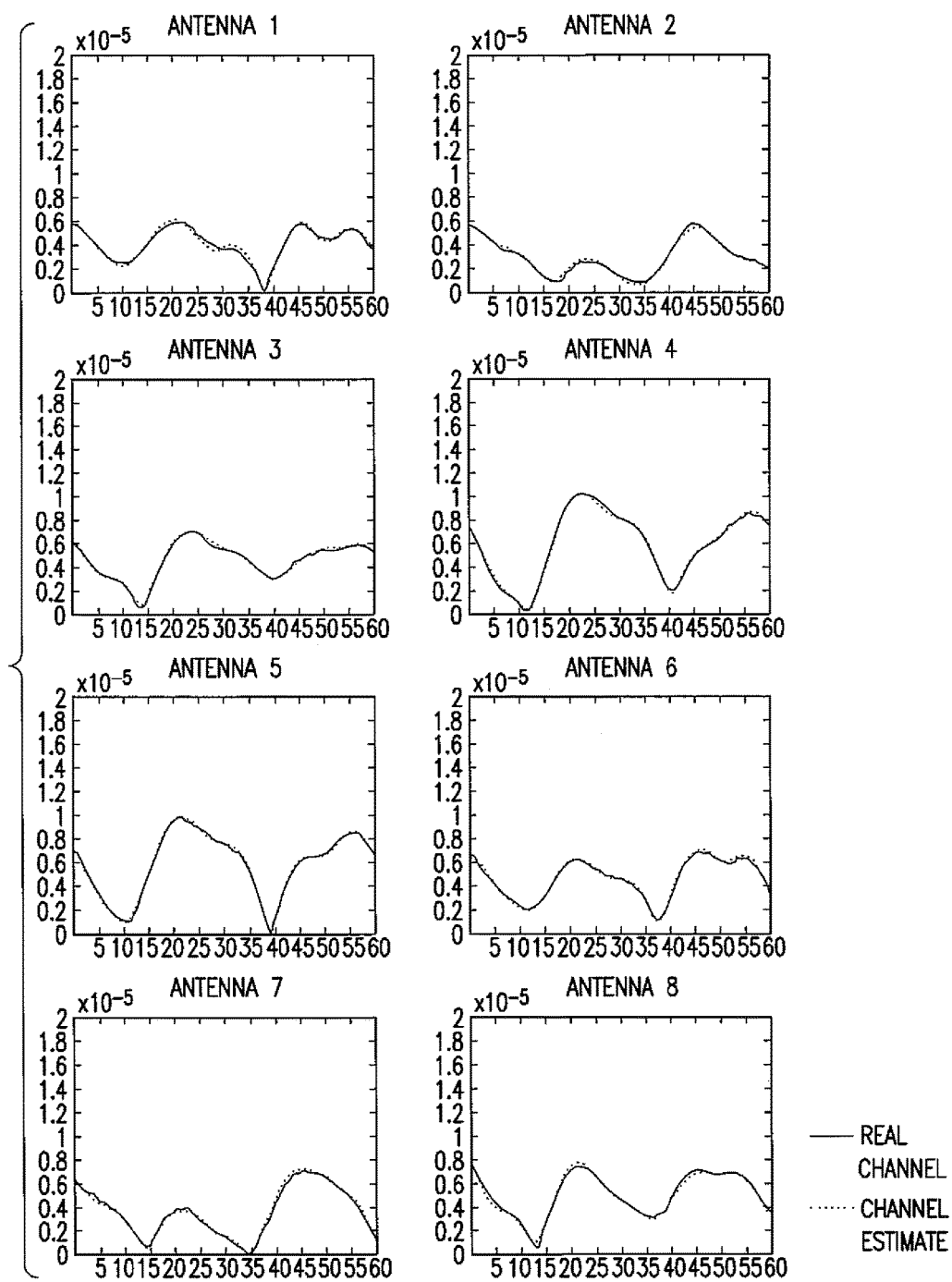
FIG. 11E plots energy of the same beams where beamforming is not used, as a comparison against FIG. 11D.

FIG. 11A is a plan view of three cells with only one UE which is located at the end of the arrow. There are a total of eight beams from a 10×8 rectangular antenna array with cell specific beamforming in the horizontal with a 15° down tilt angle. The UE is about 210 m from the array and the path loss is about −95 dB. FIG. 11B is a plan view illustrating that cell's antenna beam pattern, and FIG. 11C is received beam patterns of the UE after beamforming. Beam strength is indicated by the extent of the node, and Beam 1, Beam 2 and Beam 3 are labelled in FIG. 11C as the three strongest received beams. Quantitative data per beam are plotted at FIG. 11D for this beamforming, where beams 1 through 3 are noticeably higher energy than the remaining five beams. Beam strength is based on the UE's location and channel condition so if the UE were at a different location different beams would be strongest. For comparison, FIG. 11E plots energy of the same beams where beamforming is not used and signal strength on each antenna is at the same level.

The 3-cell 8-beam deployment detailed above for FIG. 11A is considered case 1. Now consider a more advanced case 2 with 21 cells and a total of 32 beams from a 10×32 rectangular antenna array serving 40 UEs per cell, also with cell specific horizontal-only beamforming on a 15° down-tilt angle. Tabular data comparing these two cases are shown at FIG. 12, with bandwidth savings expressed as a percentage of the no-beamforming bandwidth requirements. As highlighted there, beamforming according to these teachings can reduce the bandwidth requirements for the 32-beam case 2 down to that required for the non-beamformed 8-antenna case 1, a 75% reduction. And the data shows further reductions beyond that, which may become necessary for very large antenna arrays with beam numbers in the thousands as is anticipated for 5G, and in fact it is possible to achieve a 90% reduction when there are more than 100 beams. Note all the FIG. 12 data assumes FFT and IQ-compression at the RRH prior to transport over the FH link, as noted at the left 'baseline' column.

If there were no user information the beam selection would be blind in which case there is no overhead but the performance is highly variable. One way to do this blind beam selection where no user allocation information is available is to set the beam selection threshold based on the maximum beam energy per resource block (RB). One way to implement this blind selection algorithm is as follows:

Calculate the received energy per RB and per beam $P_{RBn}^{Bm}$ for beams m=1, 2, ... M (indexed as Bm) and for RBs n=1, 2, ... N (indexed as RBn).

For each RB, find the energy of all beams $$P_{RBn}^{Max} = \max_{m} P_{RBn}^{Bm}, \text{ for } RBn = 1, 2, \ldots N.$$

For each RB,
do not select any beams if $P_{RBn}^{Max}$ is less than a minimum energy threshold ($P_{RB}^{Min}$); for example a few dB above the noise floor depending on the beamforming gain.
select all beams for which $P_{RBn}^{Bm} \geq P_{RBn}^{TH}$, where $P_{RBn}^{TH} = (X\%)$ of $P_{RBn}^{Max}$ for each fixed RBn. Note that this X % can be dynamic based on the FH bandwidth requirement. As X % increases, the number of selected beams increases as well.

The advantages are that this algorithm is simple and requires less computation than the alternatives below for which the user allocation is available, but as mentioned above there is a high variance in its performance.

With user information the beam selection can be by SINR or by energy. SINR based beam selection requires a higher overhead and a higher computational load on the RRH, though it does offer slightly better overall performance as FIGS. 5B-C show. The energy-based beam selection, whether total received energy or maximum received energy, operates with a small overhead and very reasonable performance.

Consider the actual computations for SINR versus energy. The SINR algorithm could proceed as follows:
Calculate the $SINR_{UEn}^{Bm}$ of each beam (indexed as Bm) for each UE (indexed as UEn), for beams m=1, 2, . . . M and for UEs n=1, 2, . . . N.
For each UE, find the largest SINR of all beams $$SINR_{UEn}^{Max} = \max_{m} SINR_{UEn}^{Bm}, \text{ for } UE\ n = 1, 2, \dots N.$$

For each UEn, select all beans for which $SINR_{UEn}^{Bm} \geq SINR_{UEn}^{TH}$,
where $SINR_{UEn}^{TH} = (X\%)$ of $SINR_{UEn}^{Max}$ for each UEn.

The higher overhead is due to the user allocation and pilot symbols, and the higher computation is due to the channel estimates but this SINR approach does give the best performance.

Now consider computations for beam selection where the selection threshold is based on the total received energy for each UE allocation. This beam selection algorithm could proceed as follows:
Calculate the received energy per UE resource block (RB) allocation and per beam
$P_{UEn}^{Bm}$, for beams m=1, 2, . . . M and for UEs n=1, 2, . . . N.
Order $P_{UEn}^{Bm'}$ in descending order m'=1, 2, . . . M.
Set a selection threshold $P_{UEn}^{TH} = (X\%)$ of $P_{UEn}^{Total}$.
For each UE, select all beams that satisfy the following $\sum_{m'=1}^{M'} P_{UEn}^{Bm'} \geq P_{UEn}^{TH}$, for UE n=1, 2, . . . N.
beam m'=1, 2, . . . M' are selected.

There is a minimal overhead, only the user allocation, and less computation as compared to the SINR algorithm.

The beam energy selection can also be done by selecting the threshold based on the maximum received beam energy for each UE allocation (as opposed to total beam energy per UE allocation above). In this case the beam selection algorithm could proceed as follows:
Calculate the received energy per UE RB allocation and per beam
$P_{UEn}^{Bm}$, for beams m=1, 2, . . . M and for UEs n=1, 2, . . . N.

For each UE, find the largest energy of all beams $$P_{UEn}^{Max} = \max_{m} P_{UEn}^{Bm}, \text{ for } UE\ n = 1, 2, \dots N.$$

For each UEn
Select all beams for which $P_{UEn}^{Bm} \geq P_{UEn}^{TH}$, where $P_{UEn}^{TH} = (X\%)$ of $P_{UEn}^{Max}$ for each fixed RB n.
The overhead and computational load are essentially identical to the total received energy algorithm.

Figure 13:
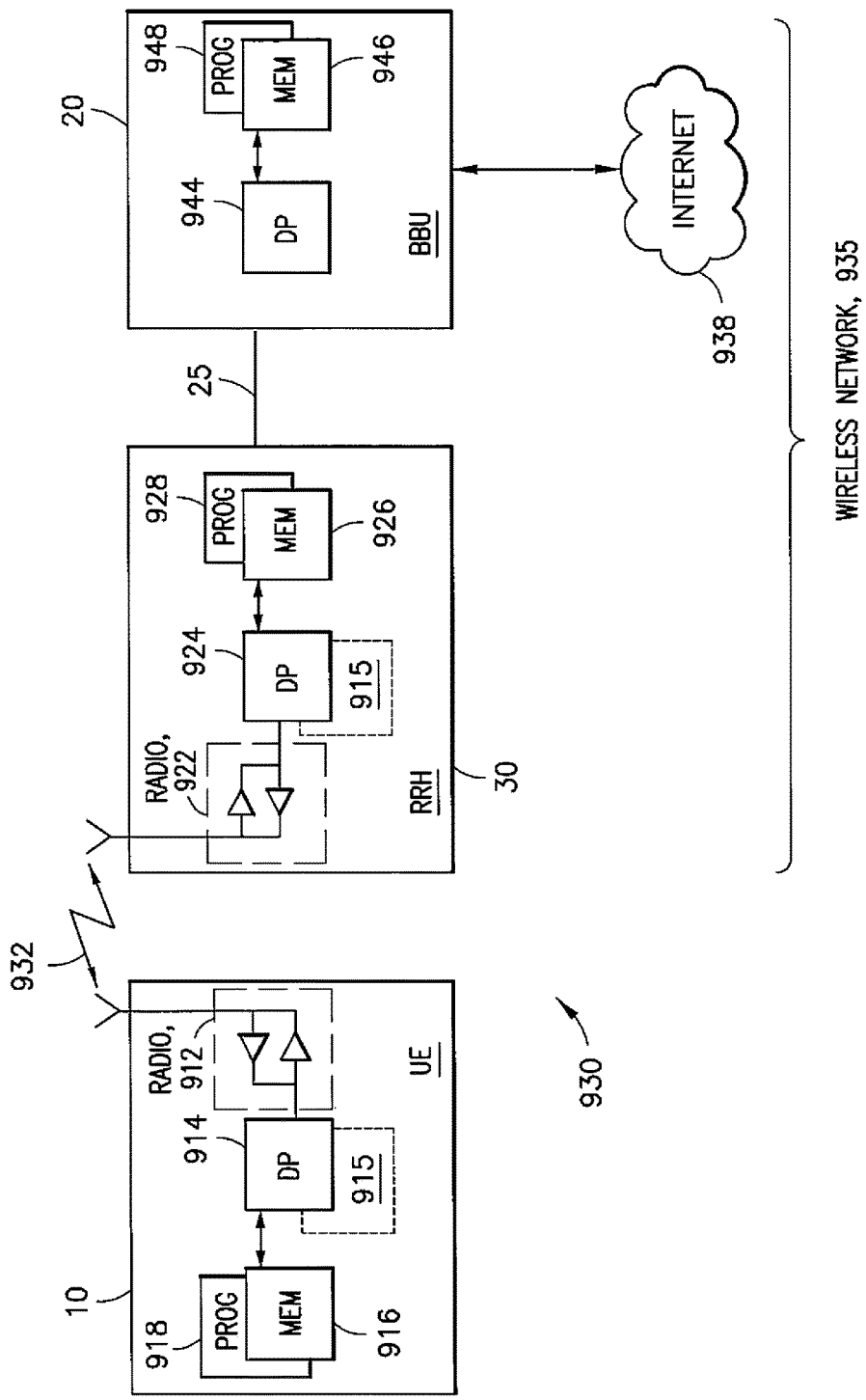
FIG. 13 is a high level schematic block diagram illustrating certain apparatus/devices that are suitable for practicing certain of these teachings.

FIG. 13 is a high level diagram illustrating some relevant components of various communication entities that may implement various portions of these teachings, including a base station identified generally as a baseband unit BBU 20, a remote radio head RRH 30 which is not co-located with the BBU 20, and a user equipment (UE) 10. In the wireless system 930 of FIG. 13 a communications network 935 is adapted for communication over a wireless link 932 with an apparatus, such as a mobile communication device which may be referred to as a UE 10, via a RRH 30. The network 935 includes the BBU 20 that performs signal processing and provides connectivity via the radio core network with other and/or broader networks such as a publicly switched telephone network and/or a data communications network (e.g., the internet 938).

The UE 10 includes a controller, such as a computer or a data processor (DP) 914 (or multiple ones of them), a computer-readable memory medium embodied as a memory (MEM) 916 (or more generally a non-transitory program storage device) that stores a program of computer instructions (PROG) 918, and a suitable wireless interface, such as radio frequency (RF) transceiver or more generically a radio 912, for bidirectional wireless communications with the radio network access node 20 via one or more antennas. In general terms the UE 10 can be considered a machine that reads the MEM/non-transitory program storage device and that executes the computer program code or executable program of instructions stored thereon. While each entity of FIG. 13 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices, cellular telephones, smartphones, wireless terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The RRH 30 also includes a controller, such as a computer or a data processor (DP) 924 (or multiple ones of them), a computer-readable memory medium embodied as a memory (MEM) 926 that stores a program of computer instructions (PROG) 928, and a suitable wireless interface, such as a RF transceiver or radio 922, for communication with the UE 10 via one or more antennas. The RRH 30 is coupled via a data/control path 25 to the BBU 20. The path 25 may be implemented as a front-haul interface. The BBU 20 may also be coupled to other RRHs via other front-haul links. Whatever processing the RRH 30 is capable of, for the UE 10 it does not take uplink signals to baseband and it does not receive baseband signals from the BBU 20 on the FH link 25.

The BBU 20 includes a controller, such as a computer or a data processor (DP) 944 (or multiple ones of them), a computer-readable memory medium embodied as a memory (MEM) 946 that stores a program of computer instructions (PROG) 948. The BBU 20 receives signals on the FH link 25 and converts them to baseband, and receives baseband signals from the core network and upconverts them from baseband prior to sending them to the RRH 30 on the FH link 25.

At least one of the PROGs 928, 948 is assumed to include program instructions that, when executed by the associated one or more DPs, enable the device to operate in accordance with exemplary embodiments of this invention. That is, various exemplary embodiments of this invention may be implemented at least in part by computer software executable by the DP 924 of the RRH 30; and/or by the DP 944 of the BBU 20; and/or by hardware, or by a combination of software and hardware (and firmware).

For the purposes of describing various exemplary embodiments in accordance with this invention the UE 10 and the RRH 30 may also include dedicated processors 915 and 925 respectively. Though not shown, the BBU 20 may also have a dedicated processor.

The computer readable MEMs 916, 926 and 946 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 914, 924 and 944 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 912 and 922) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

The following abbreviations that may be found in the specification and/or the drawing figures are defined as follows:

3GPP Third Generation Partnership Project
5G Fifth Generation wireless communication system
AAS adaptive antenna system
BBU baseband unit
C-RAN cloud (or centralized)-Radio Access Network
DMRS demodulation reference signal
E-UTRAN evolved UMTS radio access network
FFT fast Fourier transform
FH front haul
IFFT inverse fast Fourier transform
IRC interference rejection combining
L1 layer 1 (physical layer)
L2 layer 2 (media access control)
L3 layer 3 (radio resource control/non-access stratum)
LTE long term evolution (of E-UTRAN)
MIMO multiple input multiple output
PRB physical resource block
RAN radio access network
RRH remote radio head
TTI transmission time interval
UL uplink
UE user equipment
UMTS universal mobile telecommunications service

What is claimed is:

1. A method comprising:
    for a given user equipment, selecting a subset of a plurality of beams based on received energies of the plurality of beams;
    transmitting on a front haul link only data from the selected subset of beams; and
    using the received energies of each beam of the subset of beams to compress the data prior to transmitting the compressed data on the front haul link, wherein using the received energies of each beam of the subset of beams comprises:

for each respective beam of the subset of beams, selecting from a set of pre-computed minimum gain offset values stored in a local memory, wherein each minimum gain offset value is stored with an associated energy value, one minimum gain offset value having an associated energy value that most closely corresponds with the received energy of the respective beam of the subset of beams;

compressing respective data associated with each respective beam of the subset of beams after dividing in-phase and quadrature portions of the respective data by the selected one minimum gain offset value that corresponds to the respective beam; and sending indications of all of the selected one minimum gain offset values with the compressed data on the front haul link, wherein the selecting of one minimum gain offset value is performed for each pair of physical resource blocks (PRBs) per beam of the subset of beams using received energy of the pair of PRBs.

2. The method according to claim 1, wherein the subset is a predefined number of the plurality of beams.

3. The method according to claim 1, wherein selecting the subset comprises:
normalizing the received energy of each of the plurality of beams; and
selecting for the subset only those beams for which a sum of their respective normalized received energy satisfies a predefined normalized total received energy.

4. The method according to claim 1, wherein selecting the subset comprises:
calculating averaged receive energy of each of the plurality of beams, the average being across one transmission time interval;
normalizing the calculated averaged received energies;
selecting for the given user equipment the subset of beams based on the normalized calculated averaged received energies.

5. The method according to claim 1, wherein selecting the subset is based on comparing the received energies of the plurality of beams to a dynamically calculated threshold energy.

6. The method according to claim 5, wherein the threshold energy is calculated based on one of:
total received beam energy for a most recent resource allocation to the given user equipment; or
maximum received beam energy for the most recent resource allocation to the given user equipment.

7. The method according to claim 1, wherein the method is performed by a remote radio head and the data from the selected subset of beams is uplink data that is transmitted on the front haul link as beam-space data to a base band unit for baseband processing.

8. The method according to claim 1, wherein the method is performed by a base band unit and the data from the selected subset of beams is downlink data that is transmitted on the front haul link to a remote radio head for transmission over the air to the given user equipment.

9. The method according to claim 1, wherein the selecting of one minimum gain offset value is performed for each pair of physical resource blocks (PRBs) per beam of the subset of beams using received energy of the pair of PRBs.

10. An apparatus comprising:
at least one computer readable memory storing computer program instructions, and
at least one processor;
wherein the computer readable memory with the computer program instructions is configured, with the at least one processor, to cause the apparatus to perform actions comprising:
for a given user equipment, select a subset of a plurality of beams based on received energies of the plurality of beams;
transmit on a front haul link only data from the selected subset of beams; and
use the received energies of each beam of the subset of beams to compress the data prior to transmitting the compressed data on the front haul link, wherein the received energies of each beam of the subset of beams are used to compress the data by:
for each respective beam of the subset of beams, selecting from a set of pre-computed minimum gain offset values stored in a local memory, wherein each minimum gain offset value is stored with an associated energy value, one minimum gain offset value having an associated energy value that most closely corresponds with the received energy of the respective beam of the subset of beams;
compressing respective data associated with each respective beam of the subset of beams after dividing in-phase and quadrature portions of the respective data by the selected one minimum gain offset value that corresponds to the respective beam; and
sending indications of all of the selected one minimum gain offset values with the compressed data on the front haul link.

11. The apparatus according to claim 10, wherein the subset is a predefined number of the plurality of beams.

12. The apparatus according to claim 10, wherein the subset is selected by at least:
normalizing the received energy of each of the plurality of beams; and
selecting for the subset only those beams for which a sum of their respective normalized received energy satisfies a predefined normalized total received energy.

13. The apparatus according to claim 10, wherein the subset is selected by at least:
calculating averaged receive energy of each of the plurality of beams, the average being across one transmission time interval;
normalizing the calculated averaged received energies;
selecting for the given user equipment the subset of beams based on the normalized calculated averaged received energies.

14. The apparatus according to claim 10, wherein the subset is selected based on comparing the received energies of the plurality of beams to a dynamically calculated threshold energy.

15. The apparatus according to claim 10, wherein:
the apparatus is a remote radio head and the data from the selected subset of beams is uplink data that is transmitted on the front haul link as beam-space data to a base band unit for baseband processing; or
the apparatus is the base band unit and the data from the selected subset of beams is downlink data that is transmitted on the front haul link to the remote radio head for transmission over the air to the given user equipment.

16. The apparatus according to claim 10, wherein the selecting of one minimum gain offset value is performed for each pair of physical resource blocks (PRBs) per beam of the subset of beams using received energy of the pair of PRBs.

17. A computer readable memory storing computer program instructions that, when executed by one or more processors, cause a host apparatus to perform actions comprising:
- for a given user equipment, select a subset of a plurality of beams based on received energies of the plurality of beams;
- transmit on a front haul link only data from the selected subset of beams; and
- use the received energies of each beam of the subset of beams to compress the data prior to transmitting the compressed data on the front haul link, wherein the received energies of each beam of the subset of beams is used to compress the data by:
- for each respective beam of the subset of beams, selecting from a set of pre-computed minimum gain offset values stored in a local memory, wherein each minimum gain offset value is stored with an associated energy value, one minimum gain offset value having an associated energy value that most closely corresponds with the received energy of the respective beam of the subset of beams;
- compressing respective data associated with each respective beam of the subset of beams after dividing in-phase and quadrature portions of the respective data by the selected one minimum gain offset value that corresponds to the respective beam; and
- sending indications of all of the selected one minimum gain offset values with the compressed data on the front haul link.

* * * * *